United States Patent
Ooi et al.

(10) Patent No.: US 9,823,821 B2
(45) Date of Patent: Nov. 21, 2017

(54) INFORMATION PROCESSING APPARATUS, DISPLAY CONTROL METHOD, AND PROGRAM FOR SUPERIMPOSING VIRTUAL OBJECTS ON INPUT IMAGE AND SELECTING AN INTERESTED OBJECT

(71) Applicant: SONY CORPORATION, Minato-ku (JP)

(72) Inventors: Kenichirou Ooi, Kanagawa (JP); Akihiko Kaino, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 517 days.

(21) Appl. No.: 14/382,505

(22) PCT Filed: Mar. 8, 2013

(86) PCT No.: PCT/JP2013/001536
§ 371 (c)(1),
(2) Date: Sep. 2, 2014

(87) PCT Pub. No.: WO2013/153740
PCT Pub. Date: Oct. 17, 2013

(65) Prior Publication Data
US 2015/0052479 A1 Feb. 19, 2015

(30) Foreign Application Priority Data
Apr. 11, 2012 (JP) ................................. 2012-090049

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0482* (2013.01); *G06F 3/04815* (2013.01); *G06T 19/006* (2013.01)

(58) Field of Classification Search
CPC ............... G06F 3/04842; G06F 3/0482; G06F 3/04815; G06T 19/006
See application file for complete search history.

(56) References Cited

U.S. PATENT DOCUMENTS

| 2010/0027888 A1* | 2/2010 | Katano ................. G06T 19/006 382/173 |
| 2011/0074970 A1 | 3/2011 | Sukegawa |

(Continued)

FOREIGN PATENT DOCUMENTS

| CN | 102246121 A | 11/2011 |
| EP | 2 378 392 A1 | 10/2011 |

(Continued)

OTHER PUBLICATIONS

International Search Report dated Aug. 14, 2014 in PCT/JP2013/001536.

(Continued)

*Primary Examiner* — Kieu Vu
*Assistant Examiner* — Asteway T Gattew
(74) *Attorney, Agent, or Firm* — Oblon, McClelland, Maier & Neustadt, L.L.P.

(57) ABSTRACT

There is provided an information processing apparatus, including an image acquisition unit which acquires an input image generated by imaging a real space using an image pickup apparatus, a display control unit which superimposes virtual objects, which are associated with one or more real objects shown in the input image, on the input image, and a selection unit which selects, after at least one real object from among the one or more real objects is designated by a user, the designated real object as an interested object across a plurality of frames. The display control unit changes displayed information, which is displayed by the virtual object associated with the interested object, according to a (Continued)

relative position or attitude between the interested object and the image pickup apparatus.

18 Claims, 21 Drawing Sheets

(51) Int. Cl.
  *G06T 19/00* (2011.01)
  *G06F 3/0481* (2013.01)
  *G06F 3/0482* (2013.01)

(56) References Cited

U.S. PATENT DOCUMENTS

| | | | |
|---|---|---|---|
| 2011/0150292 A1 | 6/2011 | Boncyk et al. | |
| 2011/0254861 A1* | 10/2011 | Emura | G06F 3/0488 345/633 |
| 2012/0047233 A1 | 2/2012 | Jin | |
| 2012/0320248 A1 | 12/2012 | Igarashi | |
| 2013/0278636 A1* | 10/2013 | Ota | G06T 11/60 345/633 |

FOREIGN PATENT DOCUMENTS

| | | |
|---|---|---|
| EP | 2 420 978 A2 | 2/2012 |
| JP | 2010-238098 A | 10/2010 |
| TW | 201137767 A1 | 11/2011 |
| TW | 201203170 A1 | 1/2012 |
| WO | WO 2010/029671 A1 | 3/2010 |
| WO | WO 2010/073616 A1 | 7/2010 |

OTHER PUBLICATIONS

Office Action dated Jul. 12, 2016 in Japanese Patent Application No. 2012-090049.
Combined Chinese Office Action and Search Report dated Jul. 26, 2016 in Patent Application No. 201310116242.2 (with English language translation).

* cited by examiner

[Fig. 1]
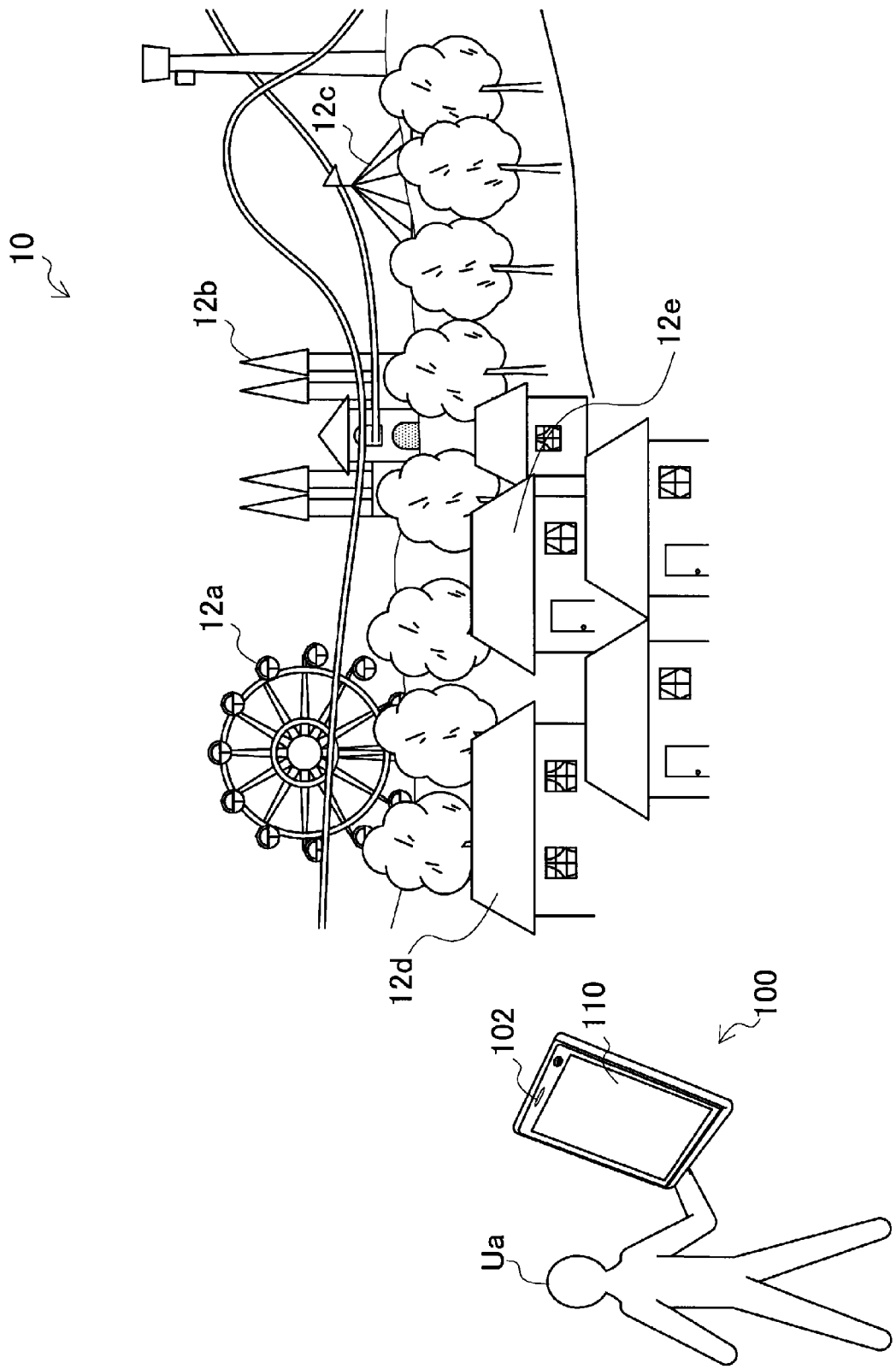

[Fig. 2]
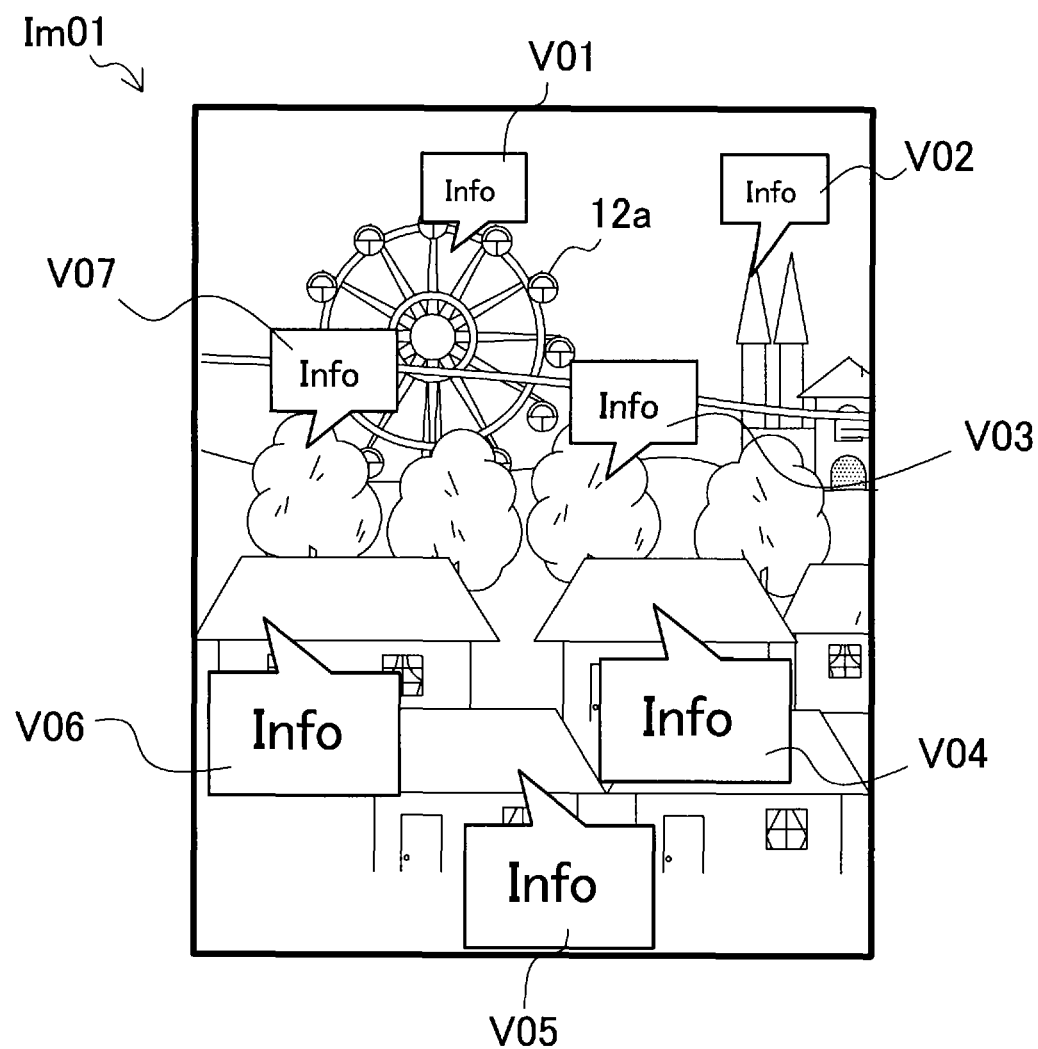

[Fig. 3]
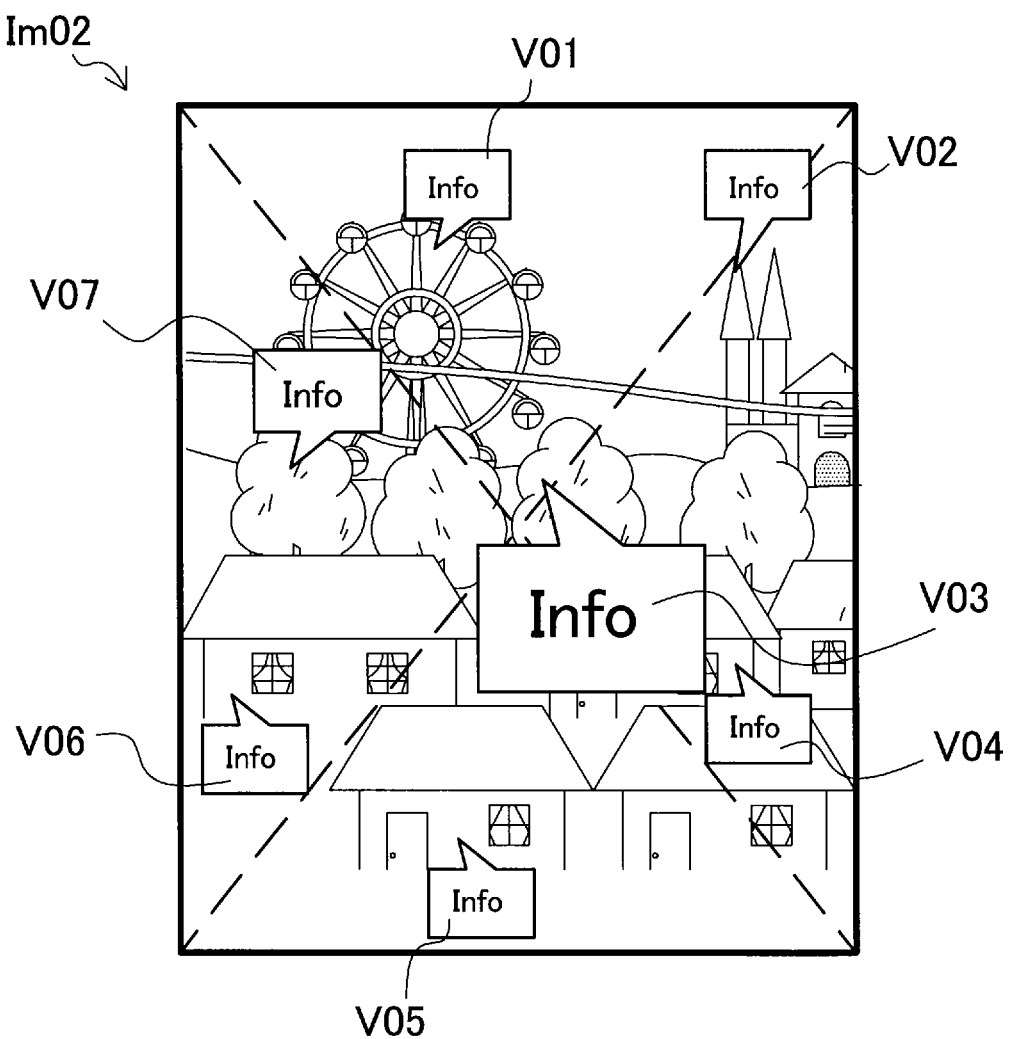

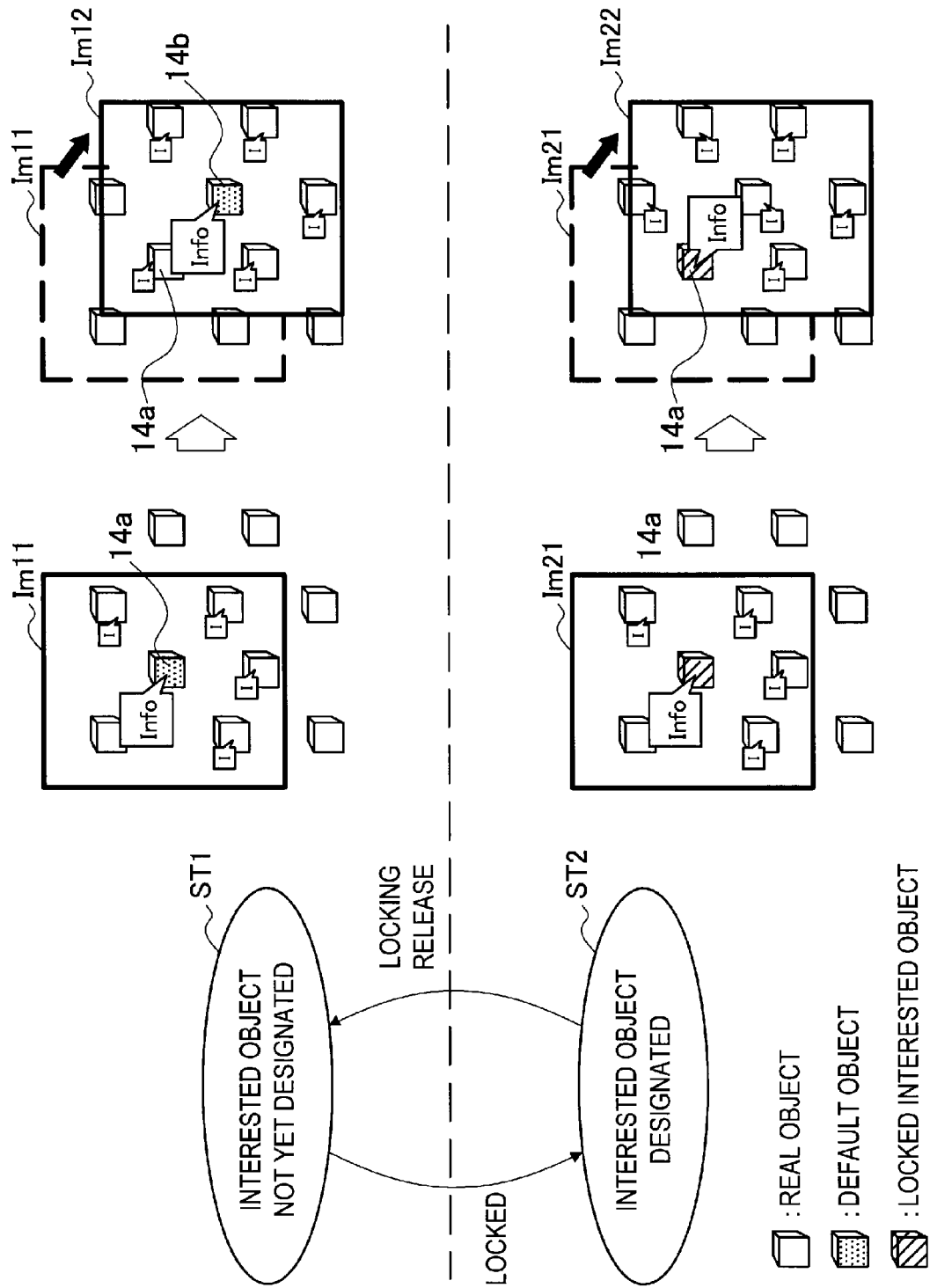

[Fig. 5]
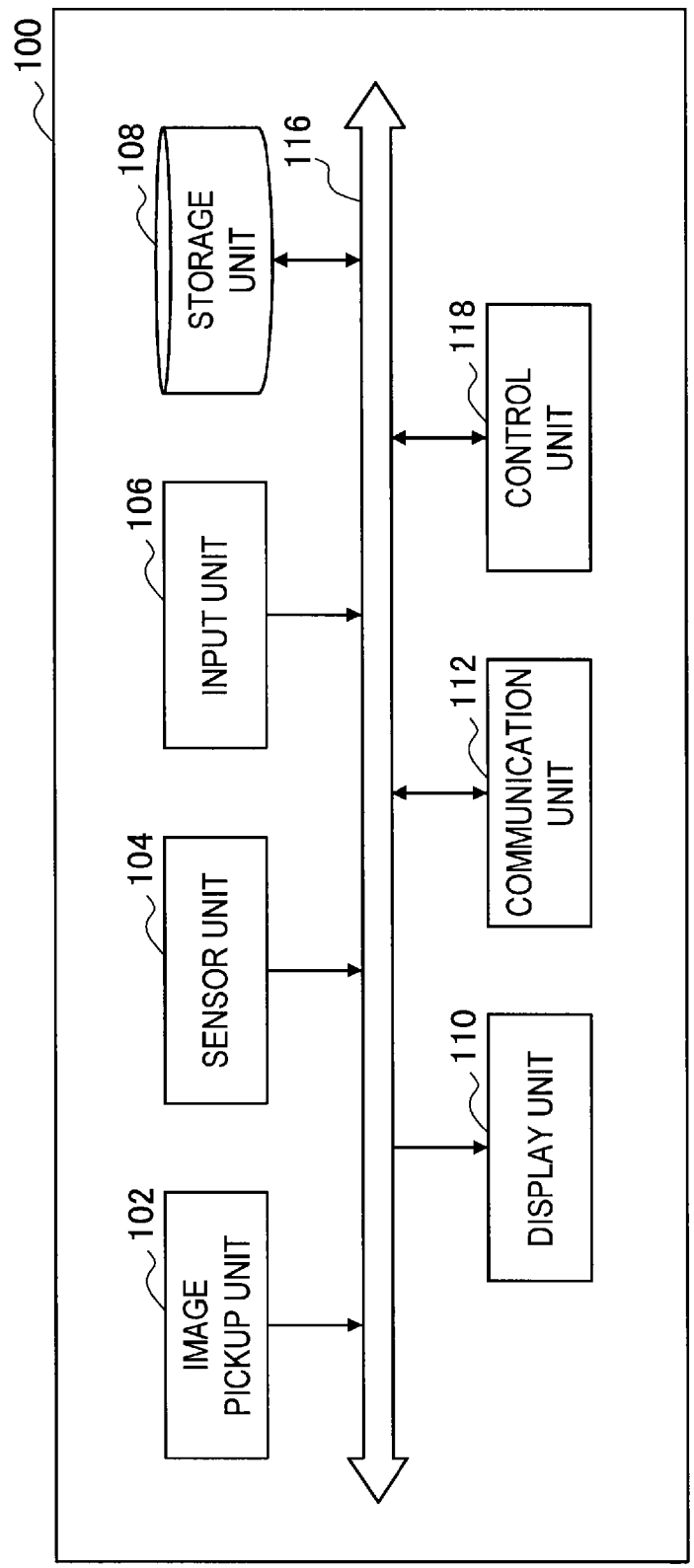

[Fig. 6]
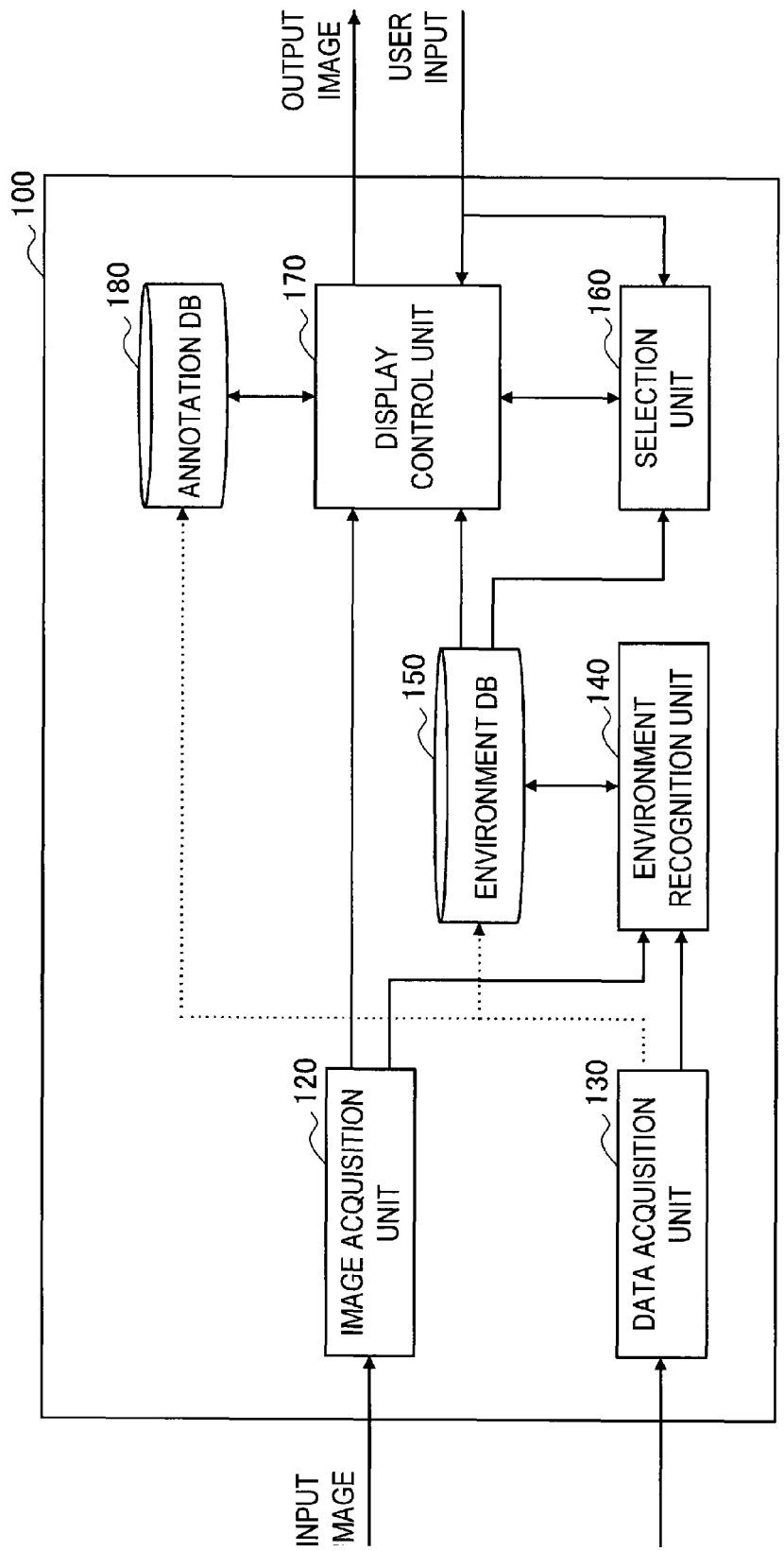

[Fig. 7]
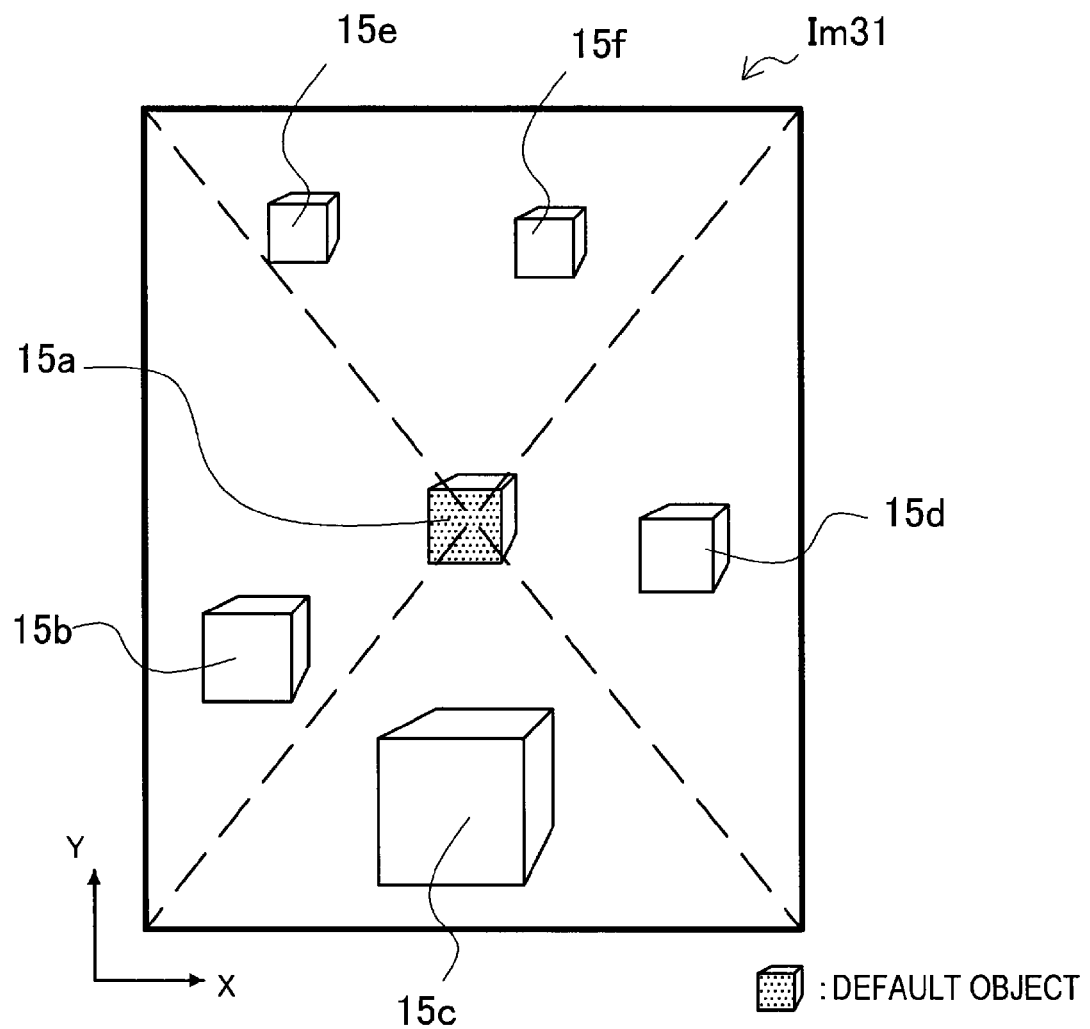

[Fig. 8]
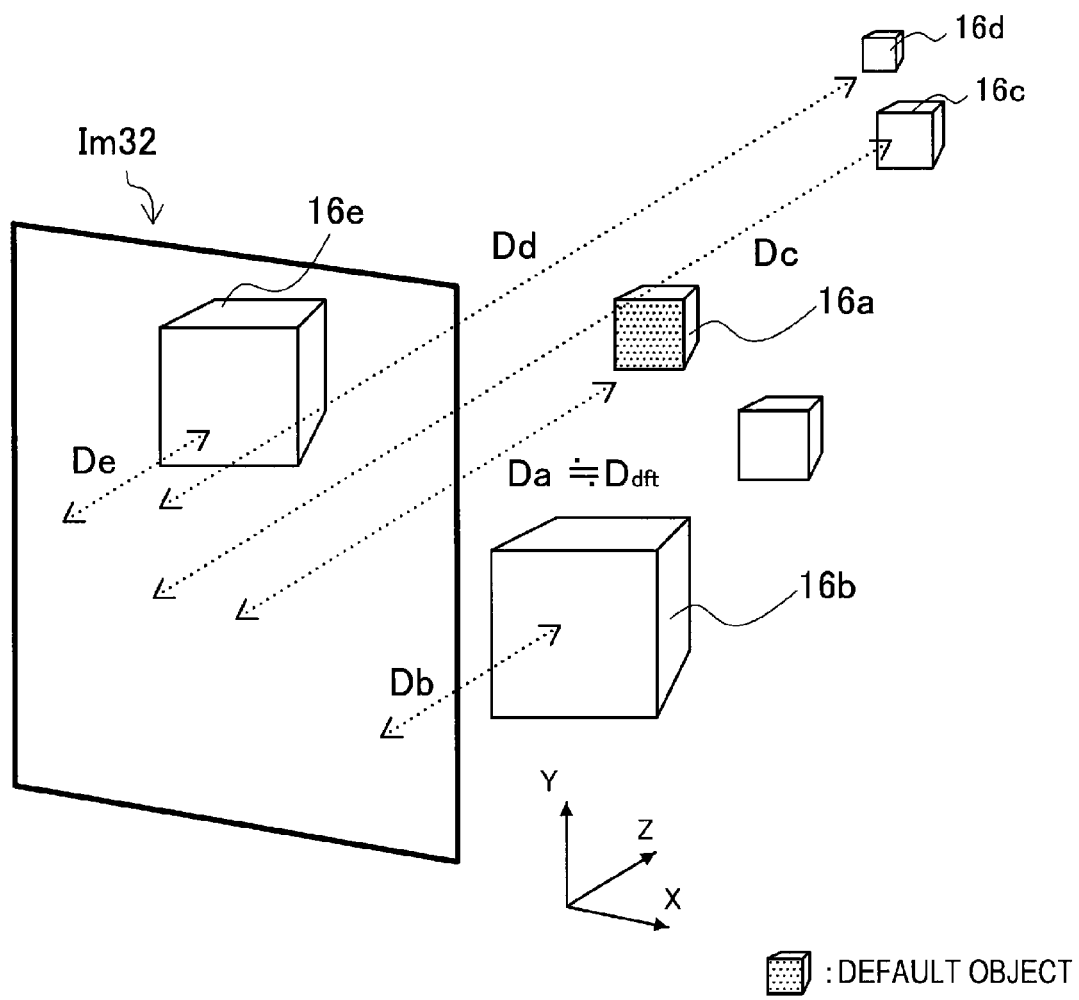

[Fig. 9]
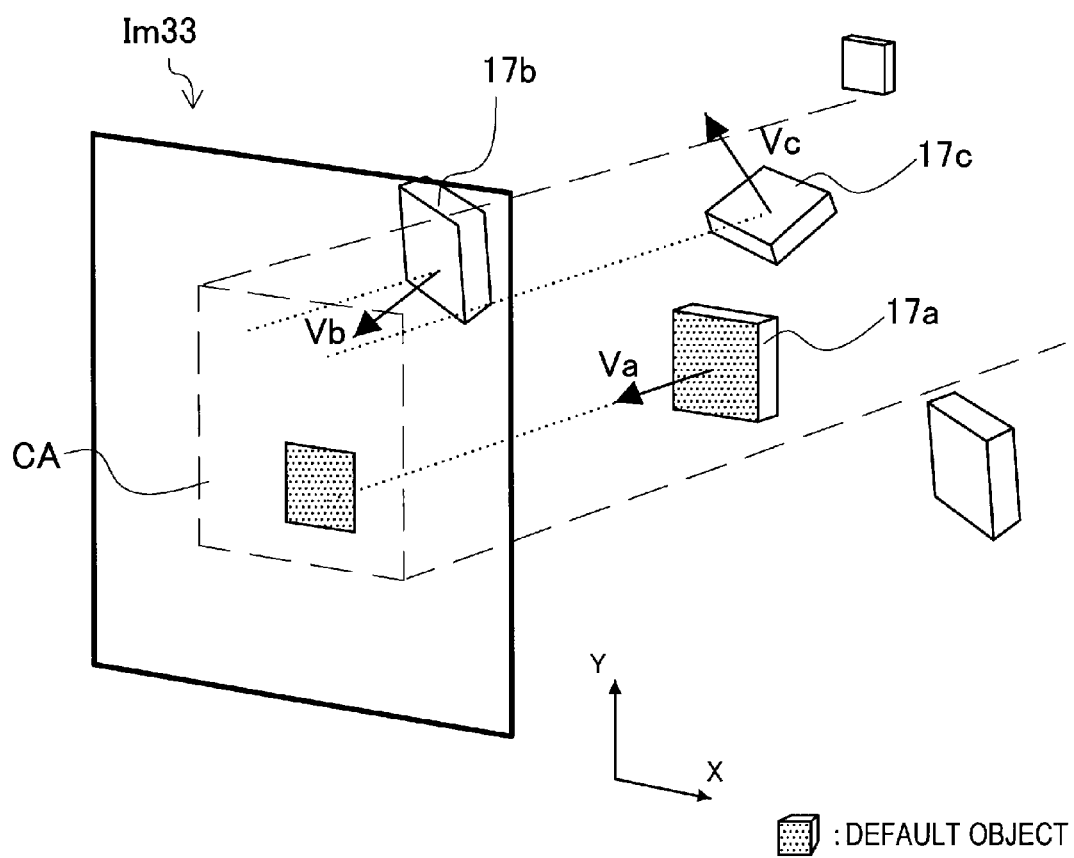

[Fig. 10]
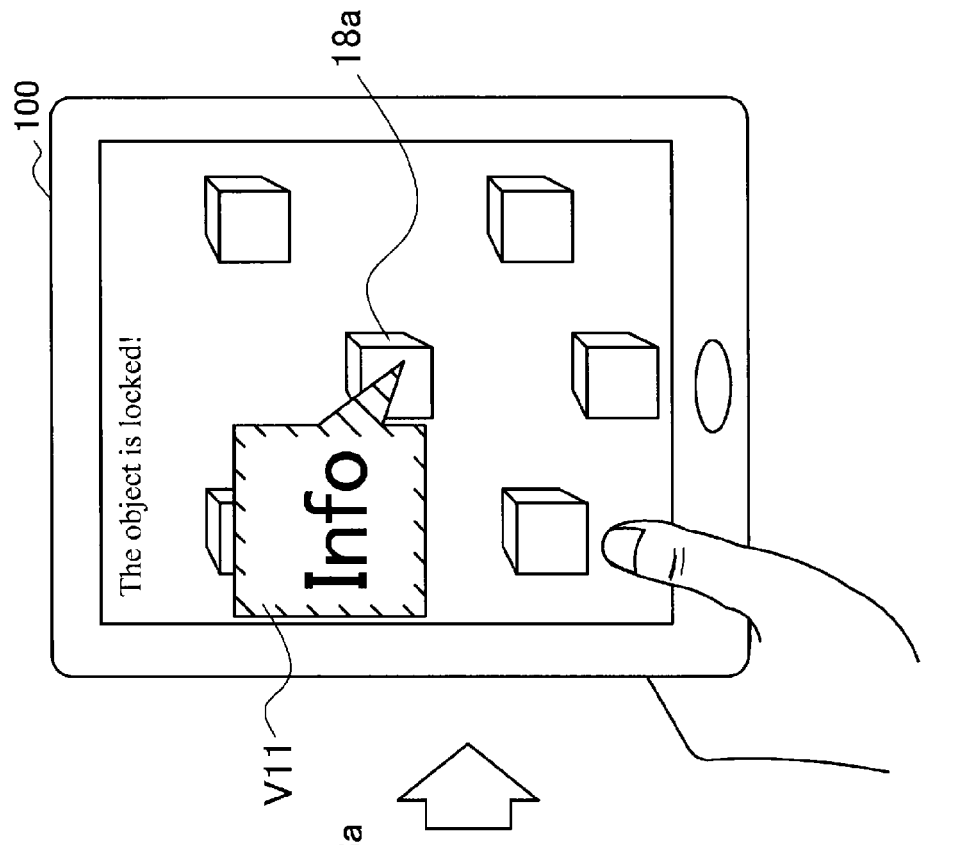
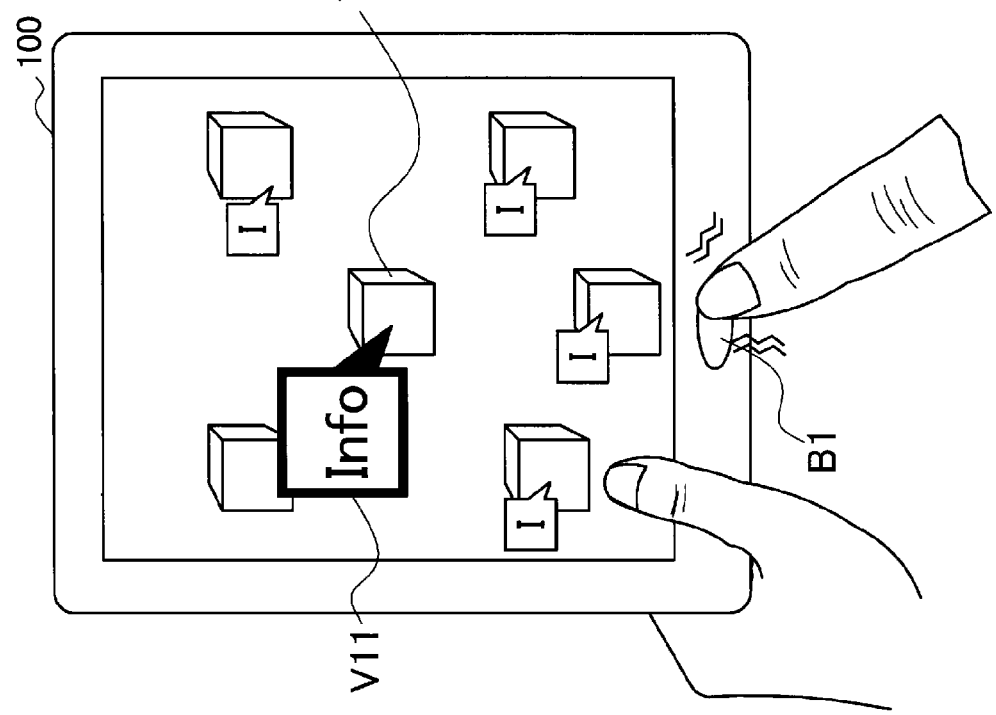

[Fig. 11]
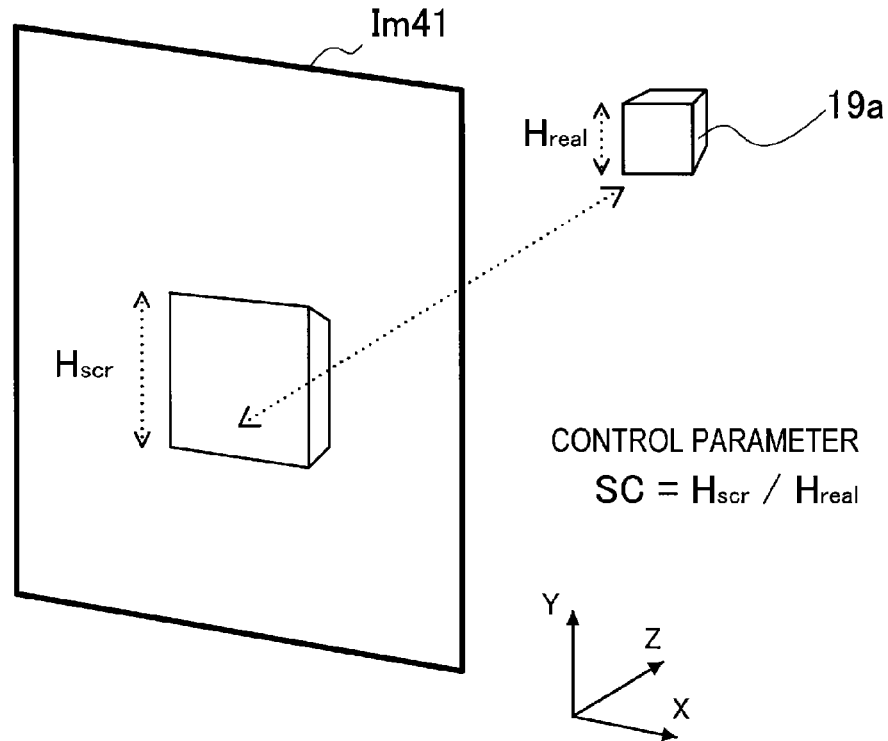
CONTROL PARAMETER
SC = $H_{scr}$ / $H_{real}$
[Fig. 12]
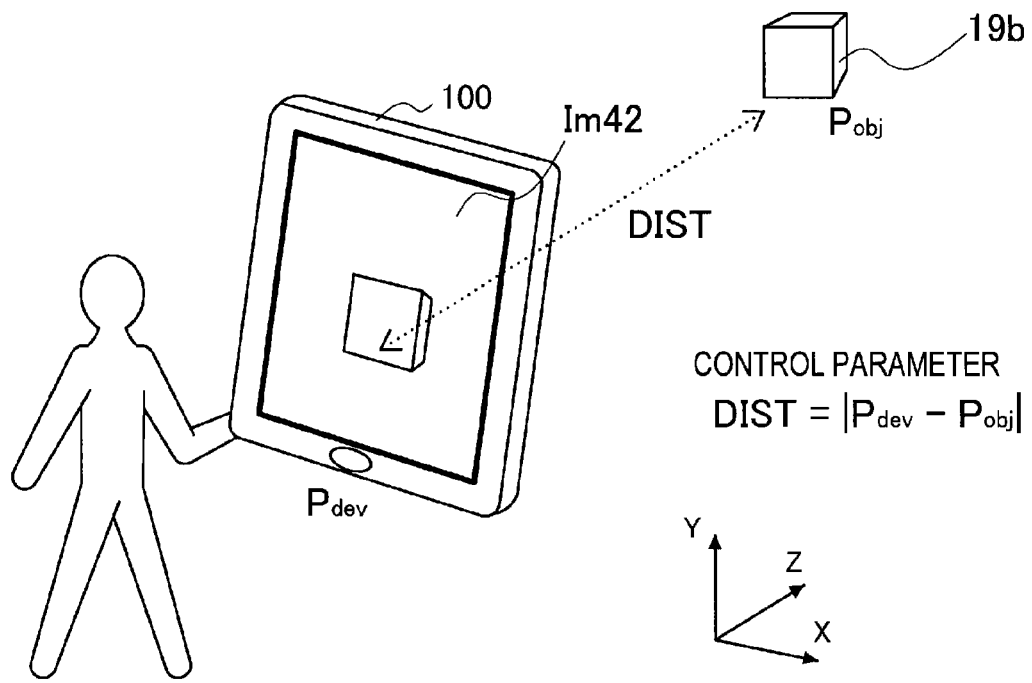
CONTROL PARAMETER
DIST = $|P_{dev} - P_{obj}|$

[Fig. 13]
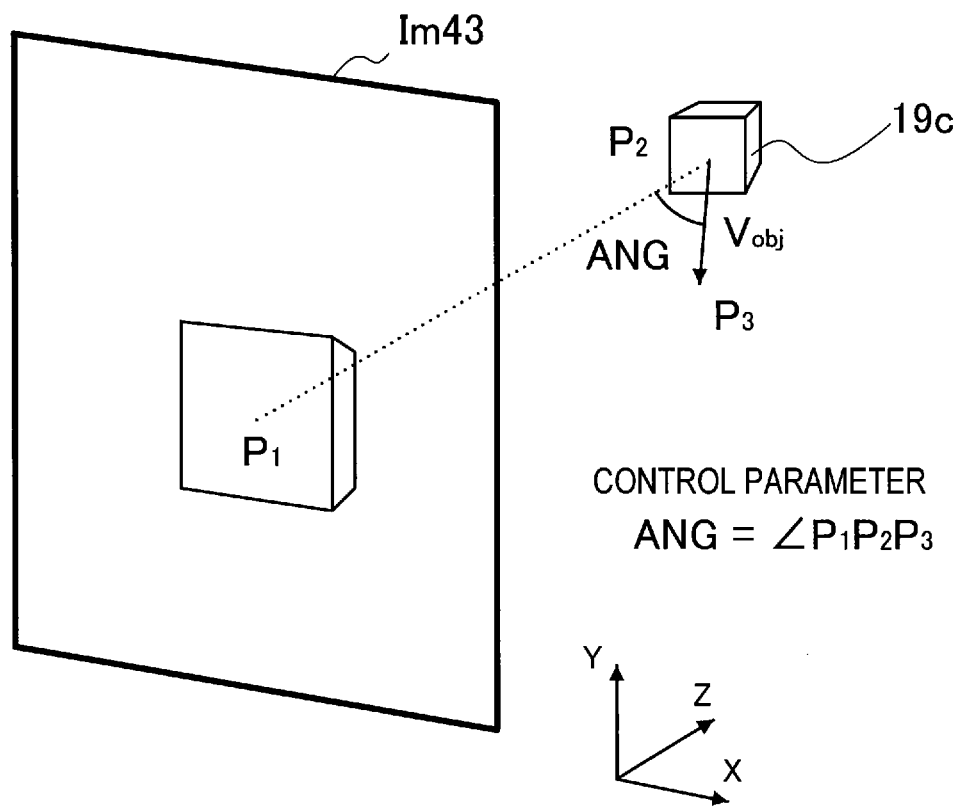

[Fig. 14]

| Category | Object ID | Annotation ID | Control Type | Display Range | Data | Description |
|---|---|---|---|---|---|---|
| Food Menu | MN1 | AMN11 | Scale | [1.0, 3.0] | ... | Rating |
| Food Menu | MN1 | AMN12 | Scale | [3.0, 5.0] | ... | Review Comments |
| .. | .. | .. | .. | .. | .. | .. |
| Facility | FC2 | AFC21 | Distance | [100, 1000] | ... | Place Indication |
| Facility | FC2 | AFC22 | Distance | [30, 120] | ... | Entrance Info |
| .. | .. | .. | .. | .. | .. | .. |
| Show Piece | SP3 | ASP31 | Distance & Angle | [1.0, 3.0] & [*, -15] | ... | Outline about Right View |
| Show Piece | SP3 | ASP32 | Distance & Angle | [1.0, 3.0] & [-20, 20] | ... | Outline about Front View |
| Show Piece | SP3 | ASP33 | Distance & Angle | [1.0, 3.0] & [15, *] | ... | Outline about Left View |
| Show Piece | SP3 | ASP34 | Distance & Angle | [0.3, 1.0] & [-20, 20] | ... | Detailed Info |
| .. | .. | .. | .. | .. | .. | .. |

[Fig. 15A]
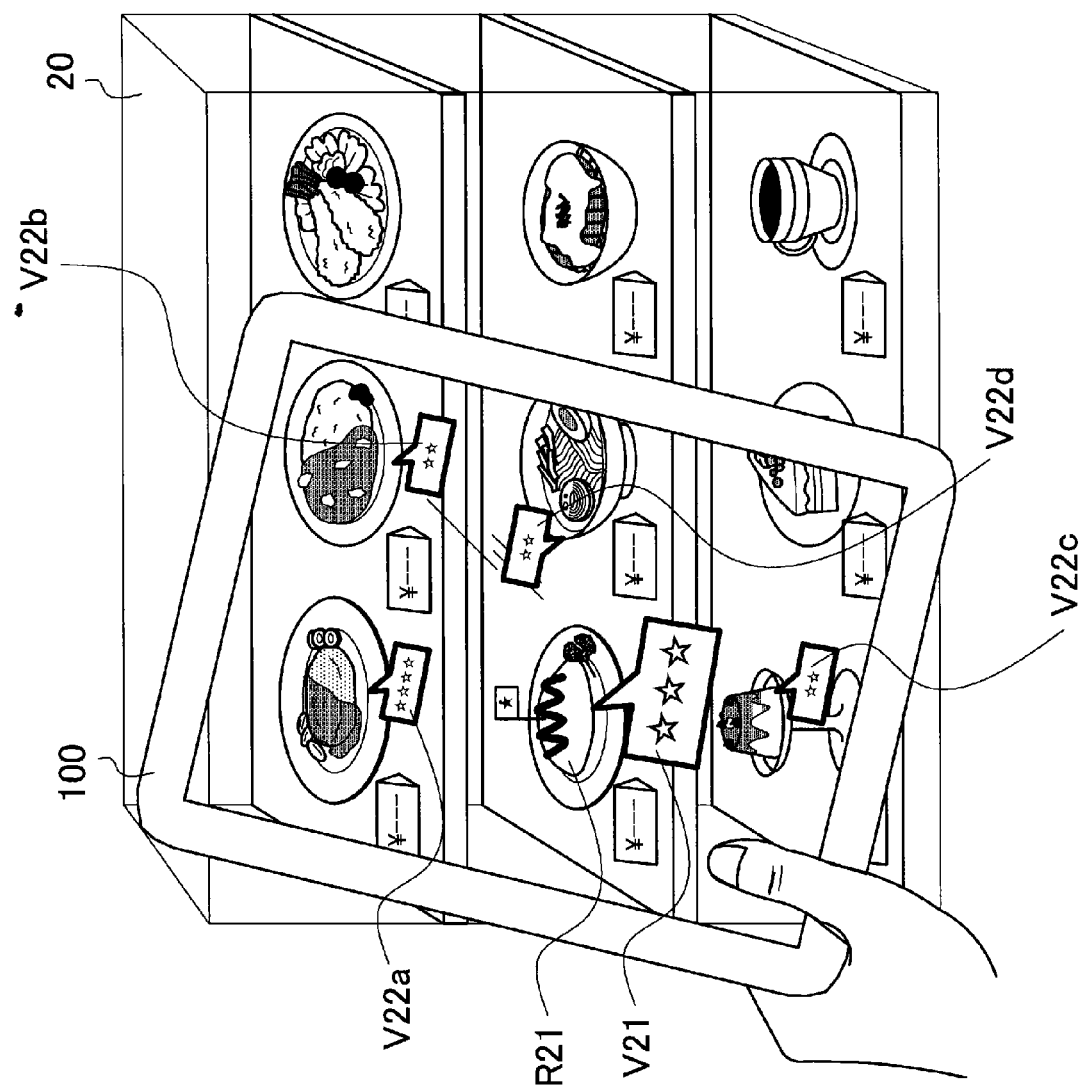

[Fig. 15B]
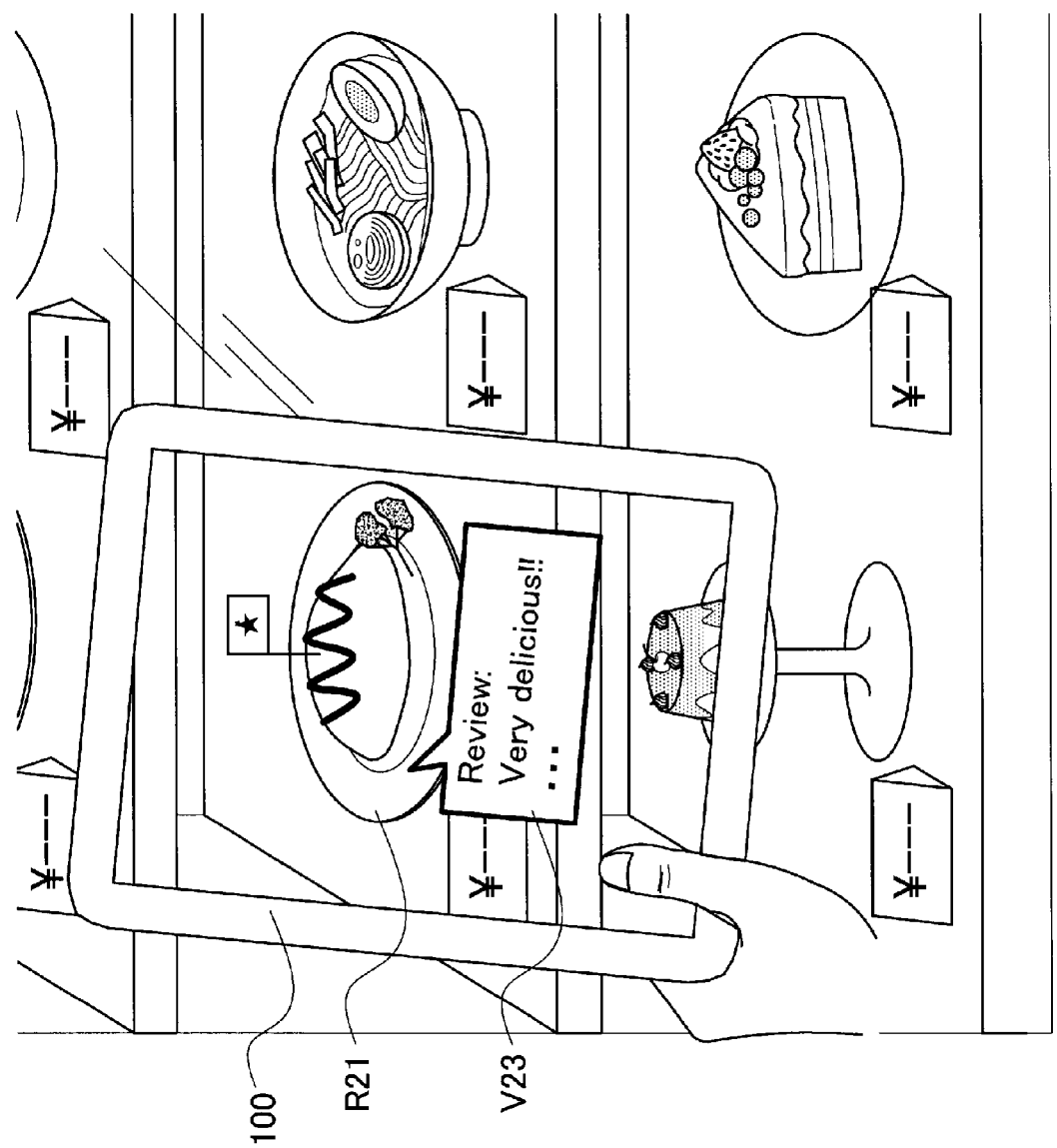

[Fig. 16A]
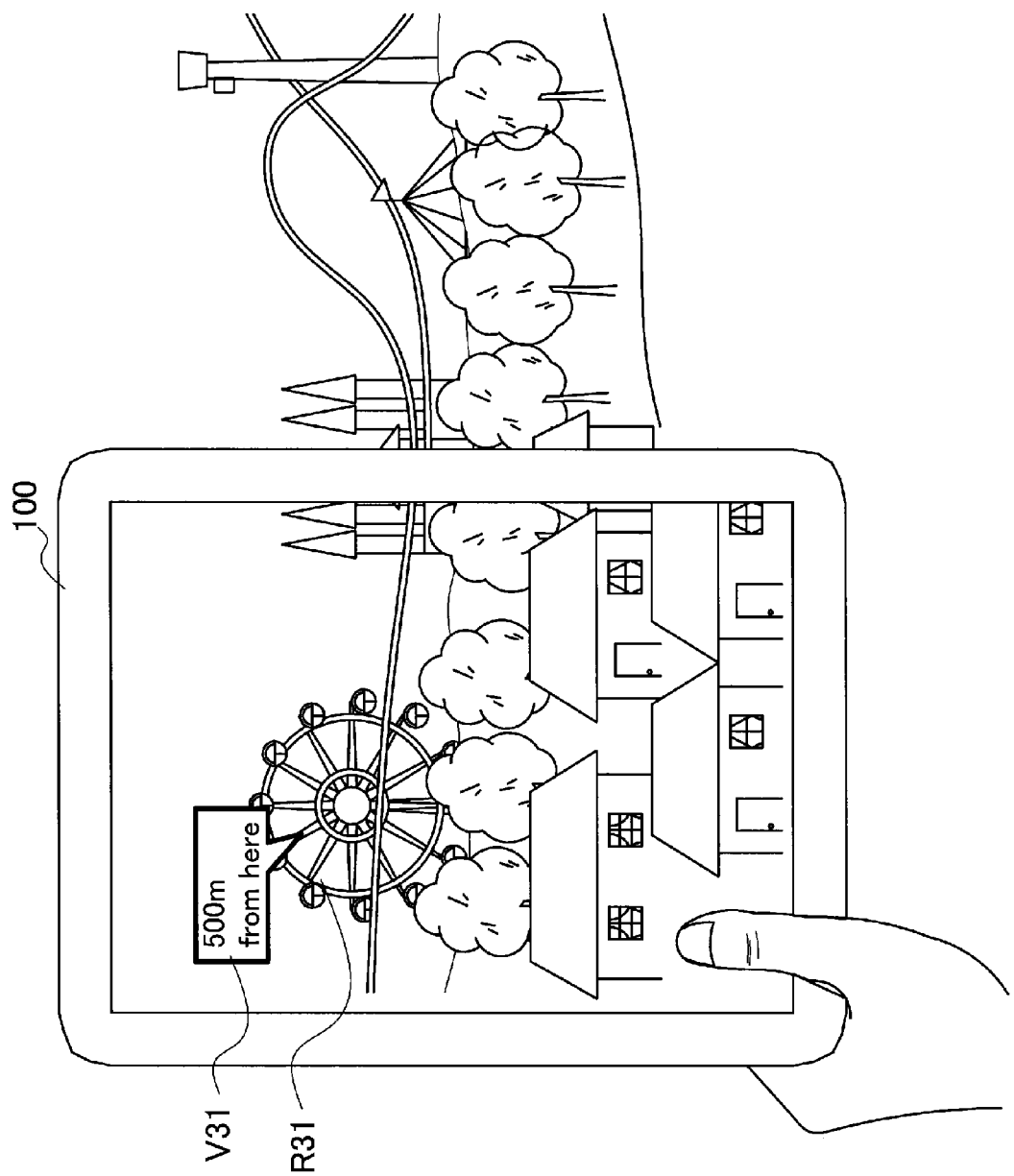

[Fig. 16B]
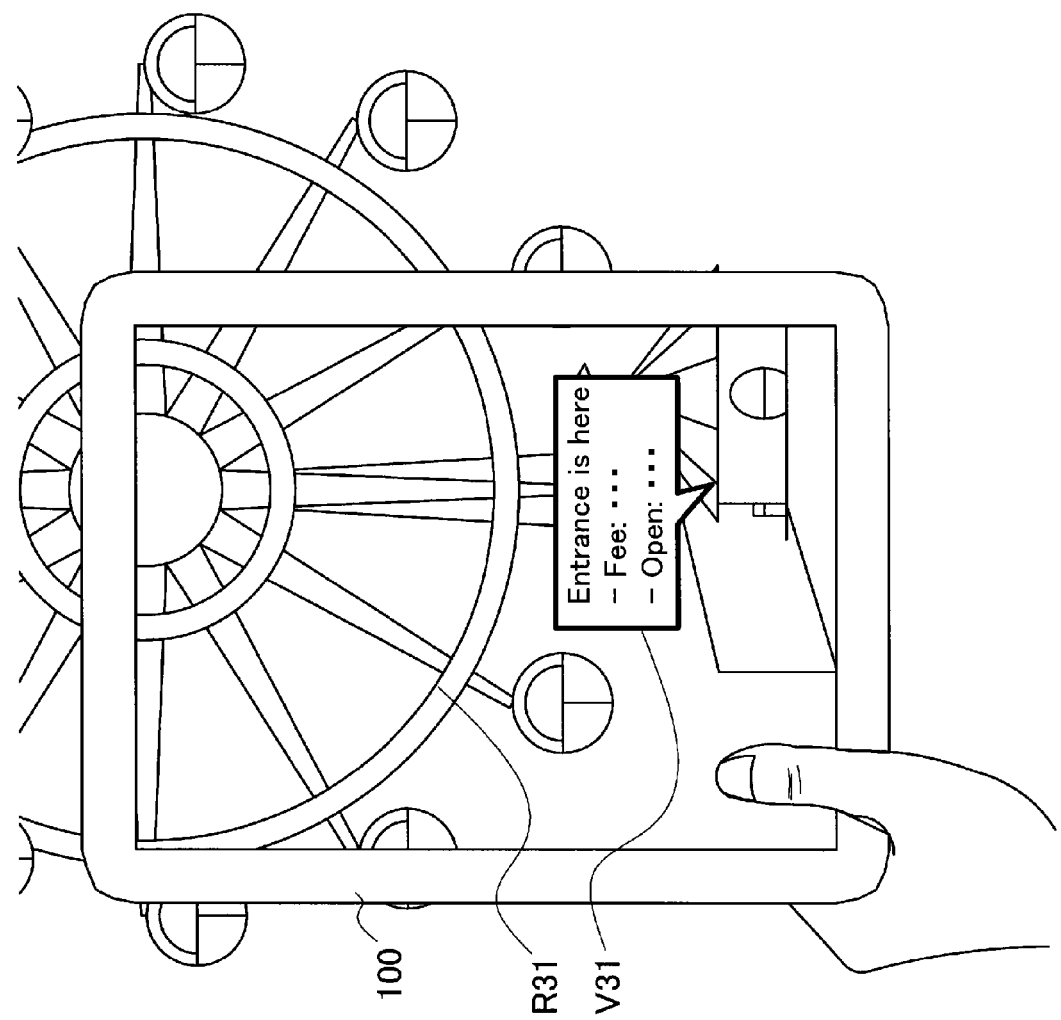

[Fig. 17A]
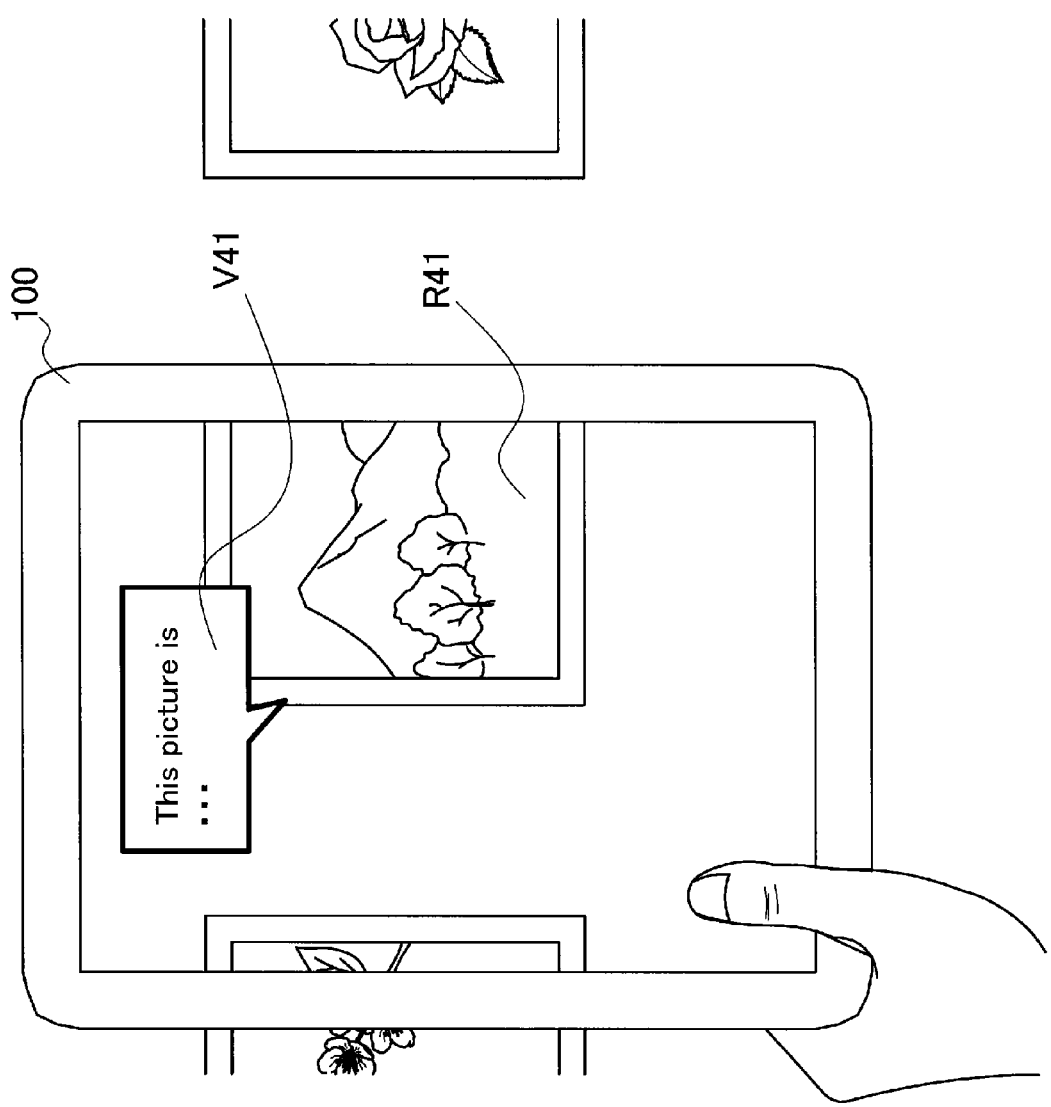

[Fig. 17B]
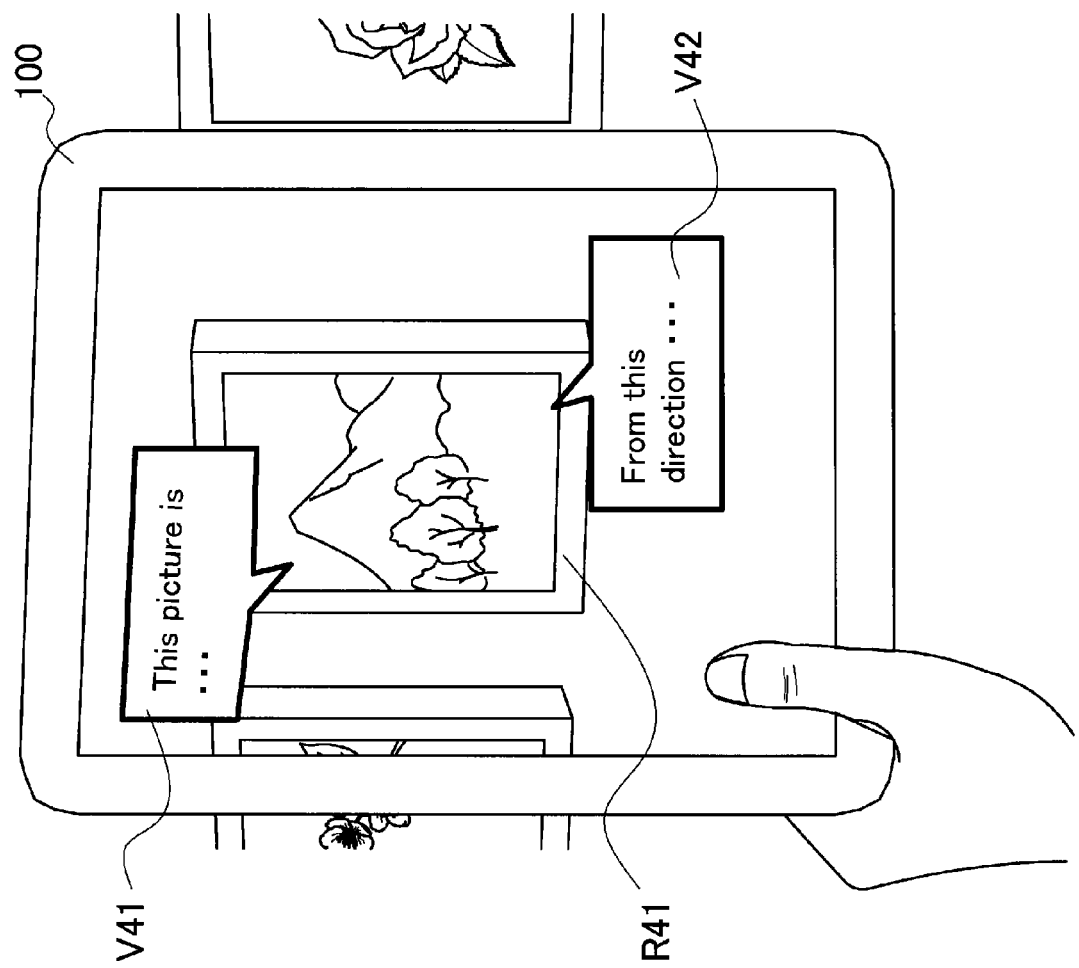

[Fig. 18]
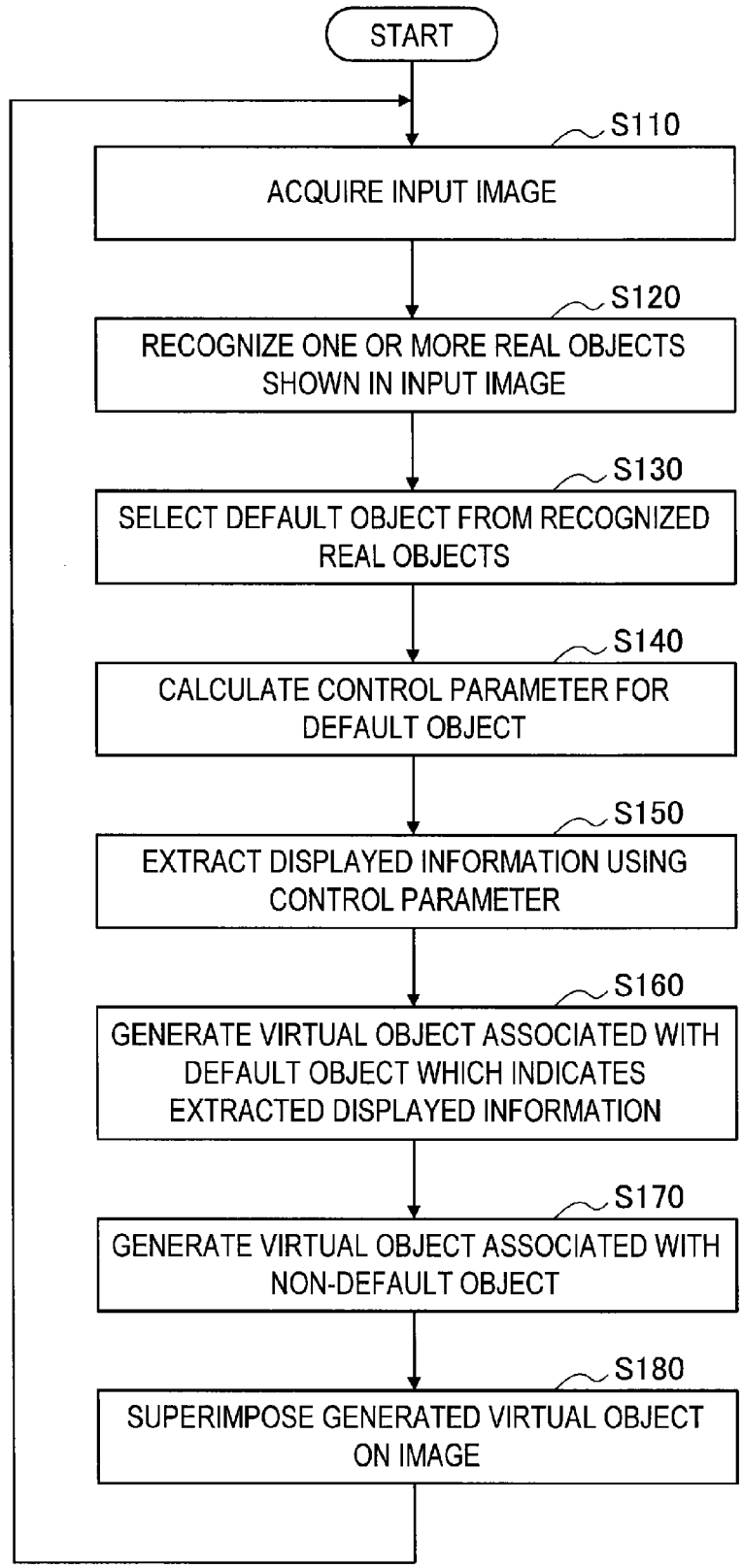

[Fig. 19]
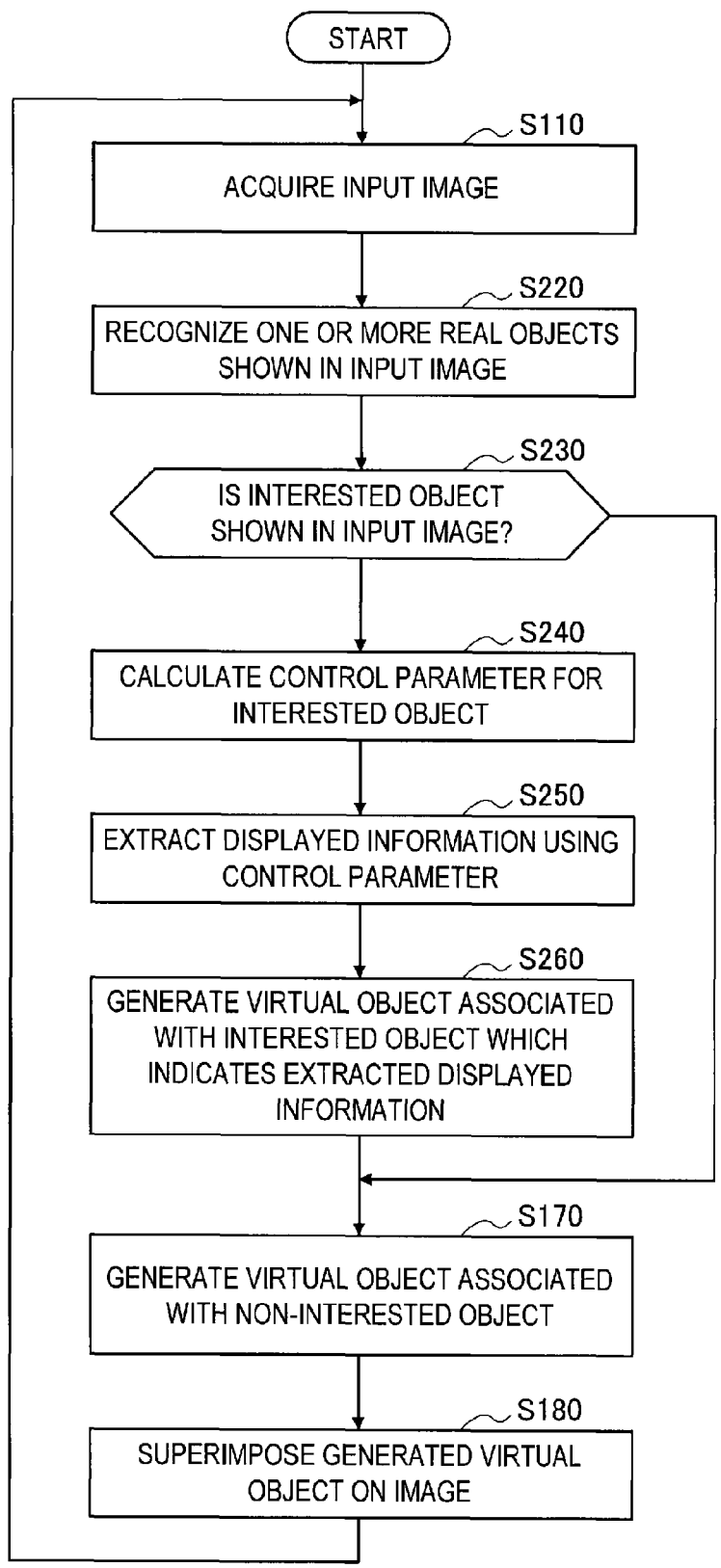

INFORMATION PROCESSING APPARATUS, DISPLAY CONTROL METHOD, AND PROGRAM FOR SUPERIMPOSING VIRTUAL OBJECTS ON INPUT IMAGE AND SELECTING AN INTERESTED OBJECT

TECHNICAL FIELD

The present disclosure relates to an information processing apparatus, a display control method, and a program.

The present disclosure contains subject matter related to that disclosed in Japanese Priority Patent Application JP 2012-090049 filed in the Japan Patent Office on Apr. 11, 2012, the entire content of which is hereby incorporated by reference.

BACKGROUND ART

In recent years, a technology called augmented reality (AR), which superimposes additional information on a real space and presents this superimposed additional information to a user, has been attracting attention. Information presented to the user in AR technology is called an annotation, and can be visualized using virtual objects in a variety of forms, such as text, icons, or animations. Annotations are usually displayed at positions associated with any real object shown in an input image.

When information is provided to the user through AR technology, it is important that visibility of the information is not lost. If there is a lot of presented information, visibility tends to be reduced as a result of too many virtual objects being superimposed on the image. Accordingly, the following [PTL 1] proposes improving the visibility of information by integrating a plurality of virtual objects into one collective virtual object.

CITATION LIST

Patent Literature

PTL 1: JP 2010-238098A

SUMMARY

Technical Problem

However, the information requested by the user is usually only a part of the presented miscellaneous information. If information desired by the user is integrated without being distinguished from other information, it may result instead in a reduction in visibility. Further, while information superimposed on an image can change as a result of the user himself or herself moving or the user moving a terminal, the above described [PTL 1] does not present a favorable solution as to how information desired by the user should be handled under such a changing situation.

Therefore, it is desired to provide an arrangement which can distinguish, within a large amount of information presented through an AR application, information desired by a user from other information, and which can selectively improve the visibility of this desired information.

Solution to Problem

According to an embodiment of the present disclosure, there is provided an information processing apparatus, including an image acquisition unit which acquires an input image generated by imaging a real space using an image pickup apparatus, a display control unit which superimposes virtual objects, which are associated with one or more real objects shown in the input image, on the input image, and a selection unit which selects, after at least one real object from among the one or more real objects is designated by a user, the designated real object as an interested object across a plurality of frames. The display control unit changes displayed information, which is displayed by the virtual object associated with the interested object, according to a relative position or attitude between the interested object and the image pickup apparatus.

Further, according to an embodiment of the present disclosure, there is provided an display control method, including acquiring an input image generated by imaging a real space using an image pickup apparatus, superimposing virtual objects, which are associated with one or more real objects shown in the input image, on the input image, selecting, after at least one real object from among the one or more real objects is designated by a user, the designated real object as an interested object across a plurality of frames, and changing displayed information, which is displayed by the virtual object associated with the interested object, according to a relative position or attitude between the interested object and the image pickup apparatus.

Further, according to an embodiment of the present disclosure, there is provided a program for causing a computer controlling an information processing apparatus to operate as an image acquisition unit which acquires an input image generated by imaging a real space using an image pickup apparatus, a display control unit which superimposes virtual objects, which are associated with one or more real objects shown in the input image, on the input image, and a selection unit which selects, after at least one real object from among the one or more real objects is designated by a user, the designated real object as an interested object across a plurality of frames. The display control unit changes displayed information, which is displayed by the virtual object associated with the interested object, according to a relative position or attitude between the interested object and the image pickup apparatus.

Advantageous Effects of Invention

According to an embodiment of the present disclosure, the visibility of information desired by the user, within a large amount of information presented through an AR application, can be selectively improved.

BRIEF DESCRIPTION OF DRAWINGS

FIG. 1 is an explanatory diagram for describing an outline of an information processing apparatus according to an embodiment of the present disclosure.

FIG. 2 is an explanatory diagram for describing an example of an image which can be displayed by existing AR technology.

FIG. 3 is an explanatory diagram for describing an example of emphatically displaying a virtual object positioned in the center of an image.

FIG. 4 is an explanatory diagram for describing the basic principles of the technology related to the present disclosure.

FIG. 5 is a block diagram which shows an example of a hardware configuration of the information processing apparatus according to an embodiment of the present disclosure.

FIG. 6 is a block diagram which shows an example of a configuration of logical functions of the information processing apparatus according to an embodiment of the present disclosure.

FIG. 7 is an explanatory diagram for describing a first example of a standard for selecting a default object.

FIG. 8 is an explanatory diagram for describing a second example of a standard for selecting a default object.

FIG. 9 is an explanatory diagram for describing a third example of a standard for selecting a default object.

FIG. 10 is an explanatory diagram which shows an example of a user interface for locking an interested object.

FIG. 11 is an explanatory diagram for describing a first example of a control parameter for controlling displayed information.

FIG. 12 is an explanatory diagram for describing a second example of a control parameter for controlling displayed information.

FIG. 13 is an explanatory diagram for describing a third example of a control parameter for controlling displayed information.

FIG. 14 is an explanatory diagram which shows an example of a configuration of an annotation DB.

FIG. 15A is a first explanatory diagram for describing an example of the control of displayed information according to scale.

FIG. 15B is a second explanatory diagram for describing an example of the control of displayed information according to scale.

FIG. 16A is a first explanatory diagram for describing an example of the control of displayed information according to distance.

FIG. 16B is a second explanatory diagram for describing an example of the control of displayed information according to distance.

FIG. 17A is a first explanatory diagram for describing an example of the control of displayed information according to angle.

FIG. 17B is a second explanatory diagram for describing an example of the control of displayed information according to angle.

FIG. 18 is a flow chart which shows an example of the flow of a display control process in an unlocked state.

FIG. 19 is a flow chart which shows an example of the flow of a display control process in a locked state.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A description will be made in the following order.
1. Outline
2. Configuration of Apparatus According to an Embodiment
  2-1. Hardware Configuration
  2-2. Functional Configuration
  2-3. Example of the Control of Displayed Information
3. Process Flow
  3-1. Unlocked State
  3-2. Locked State
4. Conclusion

1. OUTLINE

First, an outline of the technology related to the present disclosure will be described using FIGS. 1 to 4.

FIG. 1 is an explanatory diagram for describing an outline of an information processing apparatus 100 according to an embodiment of the present disclosure. Referring to FIG. 1, the information processing apparatus 100 is shown which is possessed by a user Ua. The information processing apparatus 100 includes an image pickup unit 102 which has a lens directed to a real space 10, and a display unit 110. In the example of FIG. 1, a variety of real objects 12a to 12e are present in the real space 10. The image pickup unit 102 of the information processing apparatus 100 images the real space 10. A control unit (not shown in the figure) of the information processing apparatus 100 receives the image picked up by the image pickup unit 102 as an input image, and operates an augmented reality (AR) application. Virtual objects associated with each of one or more real objects shown in the input image are superimposed on an image output from the AR application. The display unit 110 displays the superimposed image of the virtual objects.

In FIG. 1, a portable terminal is shown as an example of the information processing apparatus 100. However, the information processing apparatus 100 is not limited to such an example. The information processing apparatus 100 may be, for example, a PC (Personal Computer), a PDA (Personal Digital Assistant), a smart phone, a game terminal, a PND (Portable Navigation Device), a content player, or a digital household electrical appliance. Further, the AP application, instead of operating on a terminal operated by the user, may operate on another application capable of communicating with the terminal (application server, for example).

FIG. 2 is an explanatory diagram for describing an example of an image which can be displayed by existing AR technology. Referring to FIG. 2, a number of virtual objects V01 to V07 are superimposed on an image Im01. Each virtual object shows information related to a real object which is associated with the respective virtual object. However, when such miscellaneous information is presented, the visibility of the AR application will be reduced. Usually, information requested by the user is only part of this information. In the example of FIG. 2, it is assumed that the user is interested in the information related to the real object 12a, that is, the information shown by the virtual object V01. However, since not only the virtual object V01 but also a number of other virtual objects are superimposed on the image Im01, it is not easy for the user to identify the information related to the real object 12a from among the variety of information.

FIG. 3 shows an example of emphatically displaying a virtual object positioned in the center of an image. Referring to FIG. 3, a number of virtual objects V01 to V07 similar to those of FIG. 1 are superimposed on an image IM02. However, in the example of FIG. 3, the virtual object V03 associated with a real object positioned in the center of the image is displayed larger than the other virtual objects. By such an emphatic display, the visibility of specific information at least at this time can be ensured.

However, as described above, the AR application usually uses an image picked up by an image pickup apparatus, which is installed in a terminal carried by the user, as an input image. In the case where the user moves with the terminal, it is difficult to continuously maintain a position and an attitude of the terminal so that the camera angle does not change. Therefore, when a condition such as the user moving or the user moving the terminal is assumed, it is difficult to say that the visibility of information desired by the user can be sufficiently ensured by only emphatically displaying a virtual object of a predetermined position (for example, in the center of the image).

Accordingly, in the technology related to the present disclosure, an arrangement is adopted which allows the user to designate a real object of interest (hereinafter, called an "interested object") with a simple technique. Also, by maintaining the designation of the interested object across a plurality of frames, the visibility of information related to the interested object is continuously improved without being influenced by a change of camera angle.

FIG. 4 is an explanatory diagram for describing the basic principles of the technology related to the present disclosure.

Referring to FIG. 4, a state transition is shown between the two states ST1 and ST2. State ST1 is a state in which an interested object has not yet been designated. The initial state of the AR application may be state ST1. State ST2 is a state in which an interested object has been designated. The transition from state ST1 to state ST2 is called "locking (of the interested object)" in the present disclosure. A trigger of the locking may typically be some kind of user input. The transition from state ST2 to state ST1 is called "locking release" in the present disclosure. A trigger of the locking release may be, for example, some kind of user input, or may be a predetermined passage of time from the time of locking.

Image Im11 and image Im12 in the upper right side of FIG. 4 are an example of an image which can be displayed in the state ST1, in which an interested object has not been locked. A real object 14a is selected as a default object from among a plurality of real objects shown in the image Im11. A virtual object associated with the default object 14a is displayed more emphatically than other virtual objects. However, when a camera angle changes, the default object can also change. For example, in the image Im12, a real object 14b is selected as the default object instead of the real object 14a.

In contrast, the image Im21 and the image Im22 in the lower right side of FIG. 4 are an example of an image which can be displayed in the state ST2, in which an interested object has been locked. A real object 14a is selected as an interested object from among a plurality of real objects shown in the image Im21. A virtual object associated with the interested object 14a is displayed more emphatically than other virtual objects. Even if a camera angle changes, the locked interested object does not change. For example, in the image Im22, the real object 14a is still selected as the interested object, and the virtual object associated with the interested object 14a continues to be displayed more emphatically than the other virtual objects.

By having such a selection of an interested object maintained across a plurality of frames, in the case where displayed information corresponding to the movement of the terminal changes, information related to a real object of interest to the user can be provided with high visibility and without the user losing sight of it. An embodiment for performing such an arrangement will be described in detail from the following section.

2. CONFIGURATION OF APPARATUS ACCORDING TO AN EMBODIMENT 2-1. Hardware Configuration FIG. 5 is a block diagram showing one example of the hardware configuration of the information processing apparatus 100 according to an embodiment. As shown in FIG. 5, the information processing apparatus 100 includes the image pickup unit 102, a sensor unit 104, an input unit 106, a storage unit 108, a display unit 110, a communication unit 112, a bus 116, and a control unit 118.

(1) Image Pickup Unit

The image pickup unit 102 is a camera module that picks up an image. The image pickup unit 102 images a real space using an image pickup element such as a CCD (Charge Coupled Device) or a CMOS (Complementary Metal Oxide Semiconductor) to generate a picked-up image. The picked-up images generated by the image pickup unit 102 are used as input images for display control processing performed by the control unit 118. Note that the image pickup unit 102 does not need to be part of the information processing apparatus 100. As one example, an image pickup apparatus connected to the information processing apparatus 100 wirelessly or using wires may be treated as the image pickup unit 102.

(2) Sensor Unit

The sensor unit 104 may include a variety of sensors such as a positioning sensor (for example, a GPS (Global Positioning System) module), a geomagnetic sensor, an acceleration sensor, and a gyro sensor. The positioning sensor measures a present location of a terminal. The geomagnetic sensor measures the present posture (orientation) of the terminal. Measurement results obtained by the sensor unit 104 may be used in a variety of applications, such as acquiring data that is specific to a geographic position, supporting environment recognition, and detecting a user input. Note that the sensor unit 104 may be omitted from the configuration of the information processing apparatus 100.

(3) Input Unit

The input unit 106 is an input device used by the user to operate the information processing apparatus 100 or to input information into the information processing apparatus 100. As one example, the input unit 106 may include a touch sensor that detects touches made by the user on the screen of the display unit 110. In place of (or in addition to) this, the input unit 106 may include a pointing device such as a mouse or a touch pad. In addition, the input unit 106 may include another type of input device such as a keyboard, a keypad, a button or buttons, or a switch or switches.

(4) Storage Unit

The storage unit 108 is constructed of a storage medium such as a semiconductor memory or a hard disk drive and stores programs and data for processing by the information processing apparatus 100. The data stored by the storage unit 108 may include picked-up image data, sensor data, and data in a variety of databases (DB), described later. Note that instead of being stored in the storage unit 108, some of the programs and data described in the present specification may be acquired from an external data source (as examples, a data server, network storage, or an external memory).

(5) Display Unit

The display unit 110 is a display module including a display such as an LCD (Liquid Crystal Display), an OLED (Organic Light-Emitting Diode), or a CRT (Cathode Ray Tube). As one example, the display unit 110 is used to display an image of AR application generated by the information processing apparatus 100. Note that the display unit 110 also does not need to be part of the information processing apparatus 100. As one example, a display apparatus connected to the information processing apparatus 100 wirelessly or using wires may be treated as the display unit 110.

(6) Communication Unit

The communication unit 112 is a communication interface that serves as a mediator for communication by the information processing apparatus 100 with other apparatuses. The communication unit 112 supports an arbitrary wireless communication protocol or wired communication protocol and establishes a communication connection with other apparatuses.

(7) Bus

The bus 116 connects the image pickup unit 102, the sensor unit 104, the input unit 106, the storage unit 108, the display unit 110, the communication unit 112, and the control unit 118 to one another.

(8) Control Unit

The control unit 118 corresponds to a processor such as a CPU (Central Processing Unit) or a DSP (Digital Signal Processor). By executing a program stored in the storage unit 108 or another storage medium, the control unit 118 causes the information processing apparatus 100 to function in a variety of ways as described later.

2-2. Functional Configuration

FIG. 6 is a block diagram which shows an example of a configuration of logical functions implemented by the storage unit 108 and the control unit 118 of the information processing apparatus 100 shown in FIG. 5. Referring to FIG. 6, the information processing apparatus 100 has an image acquisition unit 120, a data acquisition unit 130, an environment recognition unit 140, an environment database (DB) 150, a selection unit 160, a display control unit 170, and an annotation DB 180.

(1) Image Acquisition Unit

The image acquisition unit 120 acquires picked-up images generated by the image pickup unit 102 as input images. The input images acquired by the image acquisition unit 120 are images projecting a real space. These input images are typically each of the frames included in a moving image. The image acquisition unit 120 outputs the acquired input images to the environment recognition unit 140 and the display control unit 170.

(2) Data Acquisition Unit

The data acquisition unit 130 acquires data used for the recognition of the environment by the environment recognition unit 140 and for the control of the display by the display control unit 170. For example, the data acquisition unit 130 may acquire sensor data (for example, position data and attitude data) generated by the sensor unit 104. Further, the data acquisition unit 130 may acquire data related to real objects present near the present position of the terminal (for example, map data which is described later, special data for image recognition, annotation data, or the like), by making an inquiry to an external database using the present position of the terminal.

(3) Environment Recognition Unit

The environment recognition unit 140 recognizes one or more real objects shown in the input image. The environment recognition unit 140 may recognize, for example, real objects which enter into the camera angle judged from the position and the attitude of the terminal, based on map data which associates an identifier of each real object with the position within a real space. The environment recognition unit 140 may acquire this map data from an external database via the data acquisition unit 130. Alternatively, the environment recognition unit 140 may recognize one or more real objects shown in the input image by applying a well-known environment recognition technology, such as that of a SURF method (refer to H. Bay, A. Ess, T. Tuytelaars and L. V. Gool, "Speeded-Up Robust Features (SURF)", Computer Vision-ECCV, 2006), or a SLAM method (refer to Andrew J. Davison, "Real-Time Simultaneous Localization and Mapping with a Single Camera", Proceedings of the 9th IEEE International Conference on Computer Vision Volume 2, 2003, pp. 1403-1410), to the input image. The environment recognition unit 140 stores the results of environment recognition in the environment DB 150.

Note that the environment recognition unit 140 may recognize only an interested object within the input image while the interested object is selected, that is, while in a locked state. In this way, the processing cost necessary for the environment recognition process can be reduced. In an unlocked state, the environment recognition unit 140 recognizes a default object and other real objects within the input image.

(4) Environment DB

The environment DB 150 is a database which stores the results of environment recognition by the environment recognition unit 140. The results of environment recognition stored by the environment DB 150 may include, for example, a three-dimensional position and attitude of the recognized real objects and the terminal in a global coordinate system. Further, the results of the environment recognition may include a position and an attitude of the recognized real objects in a coordinate system specific to the terminal (typically, a coordinate system having axes in a vertical, horizontal and depth direction with an image pickup surface regarded as a standard). Further, the results of environment recognition may include a position of the recognized real objects in a two-dimensional coordinate system of the image pickup surface. The display control unit 170, which is described later, can determine the position of virtual objects within an AR space, by using this data stored by the environment DB 150.

(5) Selection Unit

The selection unit 160 selects a default object or an interested object from one or more real objects shown in the input image. For example, in an unlocked state in which an interested object has not yet been designated by the user (state ST1 shown in FIG. 4), the selection unit 160 selects a real object specified by a given standard, from among the real objects shown in the input image, as a default object. Further, when at least one real object is designated by the user, the selection unit 160 selects (locks) the designated real object as an interested object. The selection unit 160 continues to select the designated real object as the interested object, across a plurality of frames, while in a locked state until the designation of the interested object is released (state ST2 shown in FIG. 4).

(5-1) Selection of a Default Object

In the present embodiment, the selection unit 160 automatically selects a default object, in accordance with a given standard. The given standard may be, for example, a standard related to at least one of the two-dimensional position of real objects within the input image, the three-dimensional position of real objects within a real space, and the attitude of real objects with the image pickup apparatus regarded as a standard.

FIG. 7 is an explanatory diagram for describing a first example of a standard for selecting a default object. In the first example, the standard for selecting a default object relates to the two-dimensional position of real objects within the input image. More specifically, the real object which is positioned nearest to the center of the input image is selected as the default object. Referring to FIG. 7, real objects 15*a* to 15*f* are recognized within the input image Im31 as an example. From among these real objects 15*a* to 15*f*, the real object 15*a* is positioned nearest to the center of the input image, in an XY plane with respect to the image pickup surface. Therefore, in the first example, the selection unit 160 selects the real object 15a as the default object. Note that it is not limited to such an example, and the selection unit 160 may select a real object positioned in a predetermined arbitrary location within the input image as a default object.

FIG. 8 is an explanatory diagram for describing a second example of a standard for selecting a default object. In the second example, the standard for selecting a default object relates to the three-dimensional position of real objects within a real space. More specifically, the real object positioned in a location separated by a predetermined distance from the terminal within a real space is selected as the default object. Here, the predetermined distance may be set by the user, or may be defined according to the intention of the AR application. Referring to FIG. 8, real objects 16a to 16e are recognized within the input image Im32 as an example. The distance between each of the real objects 16a to 16e and the terminal are the distances D1 to De, respectively. Here, a predetermined distance $D_{dft}$, provided as a selection standard, is assumed to be nearest to the distance Da. In this case, the selection unit 160 selects the real object 16a as the default object.

FIG. 9 is an explanatory diagram for describing a third example of a standard for selecting a default object. In the third example, the standard for selecting the default object relates to the attitude of real objects with respect to the image pickup apparatus, and the two-dimensional position of the real objects within the input image. More specifically, from among the real objects shown on a predetermined region of the center of the input image, the real object facing the image pickup surface (the front of this real object facing the direction of the image pickup surface) can be selected as the default object. In the example of FIG. 9, the predetermined region is the region CA. Real objects 17a to 17c are shown in the region CA within the input image Im33 as an example. The attitudes of the real objects 17a to 17c are recognized by the environment recognition unit 140, and can be expressed, for example, by normal vectors Va to Vc, respectively. The normal vector Va is approximately perpendicular to the image pickup surface, while on the other hand the normal vectors Vb and Vc have angles deviating significantly from being perpendicular to the image pickup surface. In this case, the selection unit 160 selects the real object 17a as the default object.

Note that the selection standards of a default object shown in FIGS. 7 to 9 are merely examples. The above described standards may be combined in any way, or other selection standards may be used for selecting a default object.

(5-2) Selection of an Interested Object

The selection unit 160 transits from an unlocked state to a locked state, according to the detection of a trigger for locking an interested object, and selects the interested object in a locked state. The trigger for locking an interested object can be detected via a user interface provided by the information processing apparatus 100. This user interface may be a graphical user interface displayed on a screen, or it may be a physical user interface such as a key or keys, or a button or buttons. Further, the user interface may be used based on gesture recognition or voice recognition.

More specifically, in the present embodiment, the selection unit 160 selects a default object, which is selected when a predetermined user input is detected via the user interface, as an interested object. Therefore, the position or the attitude of the terminal is adjusted so that a real object of interest to the user is selected as the default object, and thereafter the user can lock this real object as an interested object, by providing the trigger to the information processing apparatus 100 as described above.

FIG. 10 is an explanatory diagram which shows an example of a user interface for locking an interested object. The left side of FIG. 10 shows a real object 18a, which is selected as a default object, in an unlocked state. On the screen, a virtual object V11 associated with the real object 18a is superimposed on the image. Here, the user presses a button B1. Then, the selection unit 160 transits from an unlocked state to a locked state. The right side of FIG. 10 shows the real object 18a, which is selected as an interested object, in a locked state. Further, on the screen, the display of the virtual object V11 changes, along with a message being displayed for notifying the user that the real object 18a is locked as an interested object. According to such a user interface, the user does not have to specifically designate on the screen which of the real objects, from among the plurality of real objects shown in the input image, is selected as an interested object. Note that as described above, other types of user input, such as the input of a touch to the screen or a voice command, may be used for locking an interested object instead of pushing the button B1.

When an interested object is locked once, the selection unit 160 continues to select the same interested object across a plurality of frames, without depending on the position or the attitude of the interested object within the input image. Therefore, even if the user moves or the terminal is moved in the locked state, the interested object is maintained, and the information related to the interested object can be continuously presented. The trigger for releasing the lock may be a user input similar to the above described trigger for locking the interested object, or may be a predetermined passage of time from the time of locking.

(6) Display Control Unit

The display control unit 170 controls the display of the augmented reality (AR) application. More specifically, the display control unit 170 acquires information related to real objects shown in the input image from the annotation DB 180, and superimposes virtual objects, which show the acquired information, on the input image associated with the real objects.

In an unlocked state in which an interested object is not locked, the display control unit 170 controls the display of a virtual object associated with a default object, so that the default object selected by the selection unit 160 is capable of being identified by the user. For example, the display control unit 170 sets the display attributes, such as the shape, size, brightness, color, or permeability, of the virtual object associated with the default object to values different to those of other virtual objects.

In a locked state in which an interested object has been locked, the display control unit 170 controls the display of a virtual object associated with this interested object, so that the interested object selected by the selection unit 160 is capable of being identified by the user. The information related to real objects other than the interested object may be briefly displayed or not displayed at all, so that only the presence of the interested object is recognized by the user.

Further, the display control unit 170 changes the displayed information, which is displayed by the virtual object associated with the default object or the interested object, according to at least one of a relative position and attitude between the default or interested object and the image pickup apparatus. For example, the display control unit 170 calculates at least one control parameter which depends on the relative position or attitude between the interested object and the image pickup apparatus. Then, the display control unit 170 changes the displayed information, in accordance with the calculated control parameter.

For example, the display control unit 170 may increase the granularity of the displayed information as the distance of the image pickup apparatus from the interested object (default object) reduces. In the present disclosure, the granularity of information has the meaning of the degree of detail of information. Generally, there is a greater amount of information with a high granularity than there is of information with a low granularity. For example, in a word-of-mouth information providing service, it can be said that information such as the name, price, or rating of a product is information with a lower granularity compared to information such as a detailed description or review of the product. Further, in a map information providing service, it can be said that information such as the name or location of a facility is information with a lower granularity compared to information such as a detailed description or event information of the facility.

Further, the display control unit 170 may change, for example, the type of displayed information, according to an attitude with respect to the image pickup surface of the interested object (default object). For example, different types of information can be displayed by having the user view the same real object from any of the front, up, down, left or right directions.

FIG. 11 is an explanatory diagram for describing a first example of a control parameter for controlling displayed information. In the first example, the control parameter is a scale SC of the real objects projected on the image pickup surface. Referring to FIG. 11, a real object 19*a* is shown which is shown in an input image Im41. The size of the real object 19*a* in a real space is $H_{real}$. The size (within the image) of the real object 19*a* projected on the image pickup surface is $H_{scr}$. The control parameter SC can be calculated as $SC=H_{scr}/H_{real}$. The value of the control parameter SC becomes larger as the distance of the image pickup apparatus from the real object reduces.

FIG. 12 is an explanatory diagram for describing a second example of a control parameter for controlling displayed information. In the second example, the control parameter is a distance DIST of the image pickup apparatus from the real objects. Referring to FIG. 12, a real object 19*b* is shown which is shown in an input image Im42. In a real space, the real object 19*b* and the information processing apparatus 100 are in positions $P_{obj}$ and $P_{dev}$, respectively. The control parameter DIST can be calculated as $DIST=|P_{dev}-P_{obj}|$.

FIG. 13 is an explanatory diagram for describing a third example of a control parameter for controlling displayed information. In the third example, the control parameter is an angle ANG of the real objects with respect to the image pickup surface. Referring to FIG. 13, a real object 19*c* is shown which is shown in an input image Im43. The angle made by a normal vector $V_{obj}$ of the real object 19*c* with respect to a depth direction (Z direction) of the image pickup surface can be calculated from the attitudes of the real object 19*c* and the attitude of the terminal, which can be stored by the environment DB 150 as a result of environment recognition.

In the present embodiment, the display control unit 170 extracts information to be displayed, by filtering data suitable for the above described control parameters, from the annotation data accumulated in the annotation DB 180.

(7) Annotation DB

The annotation DB 180 is a database which accumulates information provided by the user related to each of one or more real objects present in a real space. The information presented to the user in the AR application is selected from the annotation DB 180 by the display control unit 170, and is made visible in the form of virtual objects.

FIG. 14 is an explanatory diagram which shows an example of a configuration of the annotation DB 180. Referring to FIG. 14, the annotation database 180 has the seven data items of category 182*a*, object ID 182*b*, annotation ID 182*c*, control type 182*d*, display range 182*e*, data 182*f*, and description 182*g*.

The category 182*a* shows a type of real object corresponding to each of the annotations. For example, the category of annotations 184*a* and 184*b* is a food menu. The category of annotations 184*c* and 184*d* is a facility. The category of the annotations 184*e* to 184*h* is a show piece.

The object ID 182*b* is an identifier for identifying a real object corresponding to each of the annotations. A plurality of annotations may exist for one real object.

The annotation ID 182*c* is an identifier for uniquely identifying each of the annotations.

The control type 182*d* shows a type of control parameter used when filtering each of the annotations. For example, the annotations 184*a* and 184*b* are filtered using the control parameter SC, which shows a scale. The annotations 184*c* and 184*d* are filtered using the control parameter DIST, which shows a distance. The annotations 184*e* to 184*h* are filtered using the control parameter DIST, which shows a distance, and the control parameter ANG, which shows an angle.

The display range 182*e* shows a range of values of the control parameters to which each of the annotations will be displayed. Here, the control parameters are the control parameters of the types shown by the Control Type 182*d*. For example, the information of the annotation data 184*a* is displayed in the case where the value of the control parameter SC is included in the range {1.0, 3.0}. The information of the annotation data 184*b* is displayed in the case where the value of the control parameter SC is included in the range {3.0, 5.0}. The information of the annotation data 184*c* is displayed in the case where the value of the control parameter DIST is included in the range {100, 1000}. The information of the annotation data 184*d* is displayed in the case where the value of the control parameter DIST is included in the range {30, 120}. The information of the annotation data 184*e* is displayed in the case where the value of the control parameter DIST is included in the range {1.0, 3.0}, and the value of the control parameter ANG is equal to or less than −15 degrees. The annotation data 184*f* to 184*h* are also displayed in the way shown in FIG. 14.

The data 182*f* is an entity of information of each of the annotations. The information may be described in any form, such as an image form or a link form to an external data source.

The description 182*g* shows an outline description of information of each of the annotations. For example, the annotation data 184*a* is rating information of the food menu item. The annotation data 184*b* is a review comment, corresponding to more detailed information than that of the rating information. The annotation data 184*c* is a label which indicates the location of the facility. The annotation data 184*d* is guidance information which provides guidance to the entrance of the facility, corresponding to more detailed information than that of the location of the facility. The annotation data 184*e* to 184*g* are outline information of the show piece in the case where the show piece is viewed from the right, front and left, respectively. The annotation data 184*h* is detailed information for the show piece.

In the case where an interested object is the real object MN1, for example, the display control unit 170 extracts one or both sets of data from the annotation data 184a and 184b, by using the value of the control parameter SC calculated for the real object MN1. For example, if SC=2.0 (m), the annotation data 184a is extracted, and if SC=4.0 (m), the annotation data 184b is extracted.

Similarly, in the case where an interested object is the real object FC2, for example, the display control unit 170 extracts one or both sets of data from the annotation data 184c and 184d, by using the value of the control parameter DIST calculated for the real object FC2. Here, it should be noted that the displayed ranges of the annotation data 184c and 184d mutually overlap. For example, if DIST=110 (m), both the annotation data 184c and 184d are extracted. By having such ranges applied which partially overlap, in the case where the user gradually approaches (or moves away from) the real object FC2, new information can be presented sequentially to the user, without confusing the user by suddenly replacing the displayed information.

The display control unit 170 may control the display of a virtual object associated with an interested object, so that the changing of displayed information is predicted by the user. For example, in a situation in which the real object FC2 is an interested object, in the case where the value of the control parameter DIST briefly exceeds 120 (m), the display control unit 170 superimposes a supplementary virtual object, which shows that new information will be displayed by coming closer to the real object FC2, on the image. In this way, a motivation for obtaining new information by coming closer to the interested object can be provided to the user.

Note that the control of the displayed information may be implemented without using a data configuration such as exemplified in FIG. 14. For example, the display control unit 170 may dynamically generate information with a lower granularity, by extracting part of the information or automatically creating an outline of the information from information with a high granularity, according to the value of the control parameter. In this case, the data configuration of the annotation DB 180 can be further simplified.

2-3. Example of the Control of Displayed Information (1) First Example

FIGS. 15A and 15B are explanatory diagrams for describing an example of the control of displayed information according to scale.

Referring to FIG. 15A, the information processing apparatus 100 is shown which images a menu case 20 installed in front of a restaurant. A plurality of menu items are on display in the menu case 20. The environment recognition unit 140 of the information processing apparatus 100 recognizes these menu items shown in the input image as real objects. The display control unit 170 extracts information associated with the recognized real objects from the annotation DB 180, and superimposes virtual objects, which indicate the extracted information, on the image. In the example of FIG. 15A, virtual objects V21 and V22a to V22d are superimposed on the image. These virtual objects V21 and V22a to V22d show a rating score for each of the menu items by a number of stars. The virtual object V21 shows a rating score related to a menu item R21, which is selected as an interested object or a default object.

Referring to FIG. 15B, a situation is shown in which the user brings the information processing apparatus 100 closer to the menu case 20 shown in FIG. 15A. By reducing the distance between the menu item R21 and the information processing apparatus 100, the scale of the menu item R21 will become larger. As a result, a virtual object V23, which shows a review comment related to the menu item R21, is superimposed on the image instead of the rating score related to the menu item R21.

According to the first example, the user first reviews the plurality of rating scores by imaging the entire menu case in an unlocked state, and takes an interest in one of the menu item. Then, the menu item which the user has taken an interest to is locked as an interested object, and thereafter the user can browse detailed information related to this menu item by moving the terminal closer to this menu item.

(2) Second Example

FIGS. 16A and 16B are explanatory diagrams for describing an example of the control of displayed information according to distance.

Referring to FIG. 16A, the information processing apparatus 100 is shown which images a distant view of an amusement park having various facilities. The environment recognition unit 140 of the information processing apparatus 100 recognizes the individual facilities shown in the input image as real objects. The display control unit 170 extracts information associated with the recognized real objects from the annotation DB 180, and superimposes virtual objects, which indicate the extracted information, on the image. In the example of FIG. 16A, a virtual object V31 is superimposed on the image. The virtual object V31 indicates the location of a facility R31, along with showing the distance until the facility R31.

Referring to FIG. 16B, a situation is shown in which the user approaches the facility R31 shown in FIG. 16A. The distance between the facility R31 and the information processing apparatus 100 reduces, and as a result a virtual object V32, which shows entry guidance information related to the facility R31, is superimposed on the image instead of the information of the rough location related to the facility R31.

According to the second example, the user locks an intended facility as an interested object, and moves towards this facility while referring to the information provided by the AR application. Meanwhile, it is not necessary to continuously maintain a camera angle, for example, so that the intended facility is positioned in the center of the image. Also, when approaching the intended facility, the user can browse more detailed information related to this facility.

(3) Third Example

FIGS. 17A and 17B are explanatory diagrams for describing an example of the control of displayed information according to angle.

Referring to FIG. 17A, the information processing apparatus 100 is shown which images the inside of a museum displaying various show pieces. The environment recognition unit 140 of the information processing apparatus 100 recognizes the individual show pieces shown in the input image as real objects. The display control unit 170 extracts information associated with the recognized real objects from the annotation DB 180, and superimposes virtual objects, which indicate the extracted information, on the image. In the example of FIG. 17A, a virtual object V41 is superimposed on the image. The virtual object V41 shows outline information related to a show piece R41 in the case where the show piece R41 is viewed from the front.

Referring to FIG. 17B, the information processing apparatus 100 is shown which images the show piece R41 from an angle different to that of the example of FIG. 17A. The attitude of the show piece R41 changes with respect to the image pickup surface, and as a result a virtual object V42, which shows outline information related to the show piece R41 in the case where the show piece R41 is viewed from the right side, is superimposed on the image in addition to the virtual object V41.

According to the third example, the user locks an intended show piece as an interested object. The AR application provides the user with information for this show piece. When the user moves the terminal, the user will notice that other types of information are also provided for this show piece, depending on the attitude of the terminal. If the interested object is locked, it is not necessary for the user to pay too much attention to the camera angle while the terminal is moving. Accordingly, the user can appreciate the intended show piece while referring to the provided information without feeling stressed.

In the present embodiment as described using FIGS. 15A to 17B, the displayed information, which is displayed by virtual objects, changes according to a relative position or attitude between the corresponding real objects and the terminal. However, if an interested object is locked, the user can continuously and clearly visually recognize information related to the interested object, no matter how the terminal moves, in a form which can distinguish this information from other information.

3. PROCESS FLOW

3-1. Unlocked State

FIG. 18 is a flow chart which shows an example of the flow of a display control process in an unlocked state, which is executed by the information processing apparatus 100.

Referring to FIG. 18, first the image acquisition unit 120 acquires a picked-up image generated by the image pickup unit 102 as an input image (step S110). Then, the image acquisition unit 120 outputs the acquired input image to the environment recognition unit 140 and the display control unit 170.

Next, the environment recognition unit 140 recognizes one or more real objects shown in the input image (step S120). Then, the environment recognition unit 140 stores a recognition result, which is related to the position and the attitude of the recognized real objects, in the environment DB 150.

Next, the selection unit 160 selects a default object, in accordance with a given standard, from the real objects recognized by the environment recognition unit 140 (step S130). Then, the selection unit 160 outputs an identifier of the selected default object to the display control unit 170.

Next, the display control unit 170 calculates values of the control parameter for the default object selected by the selection unit 160 (step S140). Here, the calculated control parameter may be, for example, the type of a parameter displayed by the control type 182d of the annotation DB 180 (for example, at least one of scale, distance, and angle).

Next, the display control unit 170 extracts displayed information related to the default object from the annotation DB 180, by using the calculated value of the control parameter (step S150).

Next, the display control unit 170 generates a virtual object associated with the default object, which indicates the extracted displayed information (step S160).

Further, the display control unit 170 can also generate a virtual object associated with a real object other than that of the default object (step S170).

Then, the display control unit 170 superimposes the virtual object generated in steps S160 and S170 on the image associated with the real object (step S180).

Afterwards, the process returns to step S110, and the above described display control process is repeated for a newly acquired input image. Meanwhile, a trigger of the transition to a locked state is monitored, and in the case where this trigger is detected, the information processing apparatus 100 executes a display control process in a locked state, which is described as follows.

3-2. Locked State

FIG. 19 is a flow chart which shows an example of the flow of a display control process in a locked state, which is executed by the information processing apparatus 100.

Referring to FIG. 19, first the image acquisition unit 120 acquires a picked-up image generated by the image pickup unit 102 as an input image (step S110). Then, the image acquisition unit 120 outputs the acquired input image to the environment recognition unit 140 and the display control unit 170.

Next, the environment recognition unit 140 recognizes an interested object selected by the selection unit 160, within the input image (step S220). Then, the environment recognition unit 140 stores a recognition result, which is related to a position and an attitude of the interested object, in the environment DB 150.

The subsequent processes are executed in the case where the interested object is shown in the input image (step S230).

In the case where the interested object is shown in the input image, the display control unit 170 calculates a value of the control parameter for the interested object selected by the selection unit 160 (step S240). Here, the calculated control parameter may be, for example, the type of a parameter displayed by the control type 182d of the annotation DB 180 (for example, at least one of scale, distance, and angle).

Next, the display control unit 170 extracts displayed information related to the interested object from the annotation DB 180, by using the calculated value of the control parameter (step S250).

Next, the display control unit 170 generates a virtual object associated with the interested object, which indicates the extracted displayed information (step S260).

Then, the display control unit 170 superimposes the virtual object generated in step S260 on the image associated with the interested object (step S180).

Afterwards, the process returns to step S110, and the above described display control process is repeated for a newly acquired input image. Meanwhile, a trigger of the transition to an unlocked state (a locking release) is monitored, and in the case where this trigger is detected, the state of the information processing apparatus 100 returns to an unlocked state.

4. CONCLUSION

Thus far, an embodiment of the technology related to the present disclosure has been described in detail using FIGS. 1 to 19. According to the above described embodiment of the present disclosure, in the case where displayed information for an augmented reality associated with real objects is changed according to a relative position or attitude between the real objects and a terminal, at least one real object shown in an input image is selected as an interested object, in accordance with a designation by a user, and this selection is maintained (this is, it is locked) across a plurality of frames. Also, the displayed information associated with the interested object is dynamically controlled. Therefore, if the interested object is locked, the user can continuously and clearly visually recognize information related to the interested object, no matter how the terminal moves, in a form which can distinguish this information from other information. Accordingly, even if a large amount of information which can be provided through an AP application is present, and this information is in a condition where the content of the information is dynamically changing, the visibility of information desired by a user can be selectively and effectively improved.

Further, according to the above described embodiment of the present disclosure, in the case where an interested object is not designated, a real object specified by a given standard is automatically selected as a default object, and the display of virtual objects is controlled so that the default object is capable of being identified. Therefore, at a stage in which an interested object has yet to be selected, a user can identify and freely browse respective information related to individual real objects by moving the terminal.

Further, according to the above described embodiment of the present disclosure, a default object, which is selected when a predetermined user input is detected, is selected as an interested object. Therefore, a user can easily designate an interested object when it is determined which real object is of interest. Even in the case where a number of real objects are shown in the input image, the burden on the user will be reduced, since an operation such as accurately touching or pointing towards the interested object does not have to be performed again.

The series of control processes carried out by each apparatus described in the present specification may be realized by software, hardware, or a combination of software and hardware. Programs that are included in such software may be stored in advance for example on a storage medium provided inside or outside each of the apparatus. As one example, during execution, such programs are written into RAM (Random Access Memory) and executed by a processor such as a CPU.

Instead of being implemented in the present apparatus itself, some of the logical functions of the apparatus may be implemented in an apparatus present in a cloud computing environment. In such case, the information exchanged between the logical functions may be transmitted or received between apparatuses via the communication unit 112 illustrated in FIG. 5.

Although preferred embodiments of the present disclosure are described in detail above with reference to the appended drawings, the technical scope of the disclosure is not limited thereto. It should be understood by those skilled in the art that various modifications, combinations, subcombinations and alterations may occur depending on design requirements and other factors insofar as they are within the scope of the appended claims or the equivalents thereof.

Additionally, the present technology may also be configured as below.

(1)

An information processing apparatus, including:
  an image acquisition unit which acquires an input image generated by imaging a real space using an image pickup apparatus;
  a display control unit which superimposes virtual objects, which are associated with one or more real objects shown in the input image, on the input image; and
  a selection unit which selects, after at least one real object from among the one or more real objects is designated by a user, the designated real object as an interested object across a plurality of frames, wherein
  the display control unit changes displayed information, which is displayed by the virtual object associated with the interested object, according to a relative position or attitude between the interested object and the image pickup apparatus.

(2)

The information processing apparatus according to (1),
wherein, when the interested object is not designated by the user, the selection unit selects a real object identified by a given standard, from among the one or more real objects, as a default object, and
wherein the display control unit controls display of a virtual object associated with the default object in a manner that the default object is capable of being identified by the user.

(3)

The information processing apparatus according to (2),
wherein the selection unit selects the default object, which is selected when a predetermined user input is detected, as the interested object.

(4)

The information processing apparatus according to any one of (1) to (3),
wherein the display control unit changes the displayed information, according to a parameter which depends on at least one of a distance of the image pickup apparatus from the interested object, and an angle of the interested object with respect to an image pickup surface.

(5)

The information processing apparatus according to (4),
wherein, when the distance of the image pickup apparatus from the interested object falls within a first range, the display control unit adopts first information as the displayed information, and when the distance falls within a second range nearer than the first range, the display control unit adopts second information as the displayed information, which is more detailed than the first information as the displayed information.

(6)

The information processing apparatus according to (4),
wherein, when the angle of the interested object with respect to the image pickup surface falls within a first range, the display control unit adopts first information as the displayed information, and when the angle falls within a second range different from the first range, the display control unit adopts second information different from the first information as the displayed information.

(7)

The information processing apparatus according to (4),
wherein, when a scale of the interested object projected in the image pickup surface falls within a first range, the display control unit adopts first information as the displayed information, and when the scale falls within a second range larger than the first range, the display control unit adopts second information as the displayed information, which is more detailed than the first information as the displayed information.

(8)

The information processing apparatus according to any one of (5) to (7),
wherein the first range and the second range partially overlap.

(9)
The information processing apparatus according to any one of (5) to (8),
wherein the display control unit controls display of the virtual object associated with the interested object in a manner that a change of the displayed information is predicted by the user.

(10)
The information processing apparatus according to any one of (1) to (9), further including:
a recognition unit which recognizes the one or more real objects using the input image.

(11)
The information processing apparatus according to (10),
wherein the recognition unit recognizes only the interested object within the input image while the interested object is selected.

(12)
The information processing apparatus according to any one of (1) to (9), further including:
a recognition unit which recognizes the one or more real objects by making an inquiry to a database using a position of the image pickup apparatus.

(13)
The information processing apparatus according to (2),
wherein the given standard is a standard related to a two-dimensional position of the real object within the input image.

(14)
The information processing apparatus according to (2) or (13),
wherein the given standard is a standard related to a three-dimensional position of the real object within the real space with the image pickup apparatus regarded as a standard.

(15)
The information processing apparatus according to (13) or (14),
wherein the given standard is a standard related to an attitude of the real object with the image pickup apparatus regarded as a standard.

(16)
The information processing apparatus according to any one of (1) to (15),
wherein the information processing apparatus is a portable terminal further including the image pickup apparatus.

(17)
The information processing apparatus according to any one of (1) to (16),
wherein at least one of the image acquisition unit, the display control unit, and the selection unit is realized using an apparatus in a cloud computing environment instead of the information processing apparatus.

(18)
A display control method, including:
acquiring an input image generated by imaging a real space using an image pickup apparatus;
superimposing virtual objects, which are associated with one or more real objects shown in the input image, on the input image;
selecting, after at least one real object from among the one or more real objects is designated by a user, the designated real object as an interested object across a plurality of frames; and
changing displayed information, which is displayed by the virtual object associated with the interested object, according to a relative position or attitude between the interested object and the image pickup apparatus.

(19)
A program for causing a computer controlling an information processing apparatus to operate as:
an image acquisition unit which acquires an input image generated by imaging a real space using an image pickup apparatus;
a display control unit which superimposes virtual objects, which are associated with one or more real objects shown in the input image, on the input image; and
a selection unit which selects, after at least one real object from among the one or more real objects is designated by a user, the designated real object as an interested object across a plurality of frames, wherein
the display control unit changes displayed information, which is displayed by the virtual object associated with the interested object, according to a relative position or attitude between the interested object and the image pickup apparatus.

REFERENCE SIGNS LIST

100 Information processing apparatus
102 Image pickup unit (Image pickup apparatus)
120 Image acquisition unit
140 Environment recognition unit
160 Selection unit
170 Display control unit

The invention claimed is:
1. An information processing apparatus, comprising:
circuitry configured to
    acquire an input image generated by imaging a real space using an image pickup apparatus;
    superimpose virtual objects, which are associated with one or more real objects shown in the input image, on the input image;
    select, after at least one real object from among the one or more real objects is designated by a user, the designated real object as an interested object across a plurality of frames; and
    change displayed information, which is displayed by the virtual object associated with the interested object, according to a relative position or attitude between the interested object and the image pickup apparatus, wherein
in case the interested object is not designated by the user, the circuitry selects a real object identified by a given standard, from among the one or more real objects, as a default object,
the circuitry is configured to control display of a virtual object associated with the default object in a manner that the default object is capable of being identified by the user,
in case the interested object is not designated by the user, the circuitry changes the default object to a new default object in case the input image changes to a new input image as an angle of the image pickup apparatus changes such that the new default object is selected from among another one or more real objects shown in the new input image after the angle of the image pickup apparatus has been changed, and
in case the interested object is designated by the user, the circuitry keeps the interested object without changing the interested object to a new interested object even in case the input image changes to the new input image as the angle of the image pickup apparatus changes.

2. The information processing apparatus according to claim 1,
wherein the circuitry selects the default object, which is selected when a predetermined user input is detected, as the interested object.

3. The information processing apparatus according to claim 1,
wherein the circuitry changes the displayed information, according to a parameter which depends on at least one of a distance of the image pickup apparatus from the interested object, and an angle of the interested object with respect to an image pickup surface.

4. The information processing apparatus according to claim 3,
wherein, when the distance of the image pickup apparatus from the interested object falls within a first range, the circuitry adopts first information as the displayed information, and when the distance falls within a second range nearer than the first range, the circuitry adopts second information as the displayed information, which is more detailed than the first information as the displayed information.

5. The information processing apparatus according to claim 4,
wherein the first range and the second range partially overlap.

6. The information processing apparatus according to claim 4,
wherein the circuitry controls display of the virtual object associated with the interested object in a manner that a change of the displayed information is predicted by the user.

7. The information processing apparatus according to claim 3,
wherein, when the angle of the interested object with respect to the image pickup surface falls within a first range, the circuitry adopts first information as the displayed information, and when the angle falls within a second range different from the first range, the circuitry adopts second information different from the first information as the displayed information.

8. The information processing apparatus according to claim 3,
wherein, when a scale of the interested object projected in the image pickup surface falls within a first range, the circuitry adopts first information as the displayed information, and when the scale falls within a second range larger than the first range, the circuitry adopts second information as the displayed information, which is more detailed than the first information as the displayed information.

9. The information processing apparatus according to claim 1,
wherein the circuitry recognizes the one or more real objects using the input image.

10. The information processing apparatus according to claim 9,
wherein the circuitry recognizes only the interested object within the input image while the interested object is selected.

11. The information processing apparatus according to claim 1,
wherein the circuitry recognizes the one or more real objects by making an inquiry to a database using a position of the image pickup apparatus.

12. The information processing apparatus according to claim 1,
wherein the given standard is a standard related to a two-dimensional position of the real object within the input image.

13. The information processing apparatus according to claim 12,
wherein the given standard is a standard related to an attitude of the real object with the image pickup apparatus regarded as a standard.

14. The information processing apparatus according to claim 1,
wherein the given standard is a standard related to a three-dimensional position of the real object within the real space with the image pickup apparatus regarded as a standard.

15. The information processing apparatus according to claim 1,
wherein the information processing apparatus is a portable terminal further including the image pickup apparatus.

16. The information processing apparatus according to claim 1,
wherein at least one of steps performed by the circuitry is realized using an apparatus in a cloud computing environment instead of the information processing apparatus.

17. A display control method, comprising:
acquiring an input image generated by imaging a real space using an image pickup apparatus;
superimposing virtual objects, which are associated with one or more real objects shown in the input image, on the input image;
selecting, after at least one real object from among the one or more real objects is designated by a user, the designated real object as an interested object across a plurality of frames;
changing, using circuitry, displayed information, which is displayed by the virtual object associated with the interested object, according to a relative position or attitude between the interested object and the image pickup apparatus;
in case the interested object is not designated by the user, selecting a real object identified by a given standard, from among the one or more real objects, as a default object;
controlling display of a virtual object associated with the default object in a manner that the default object is capable of being identified by the user;
in case the interested object is not designated by the user, changing the default object to a new default object in case the input image changes to a new input image as an angle of the image pickup apparatus changes such that the new default object is selected from among another one or more real objects shown in the new input image after the angle of the image pickup apparatus has been changed; and
in case the interested object is designated by the user, keeping the interested object without changing the interested object to a new interested object even in case the input image changes to the new input image as the angle of the image pickup apparatus changes.

18. A non-transitory computer readable medium including executable instructions, which when executed by a computer cause the computer to:
acquire an input image generated by imaging a real space using an image pickup apparatus;

superimpose virtual objects, which are associated with one or more real objects shown in the input image, on the input image;

select, after at least one real object from among the one or more real objects is designated by a user, the designated real object as an interested object across a plurality of frames; and change displayed information, which is displayed by the virtual object associated with the interested object, according to a relative position or attitude between the interested object and the image pickup apparatus, wherein in case the interested object is not designated by the user, the computer is configured by the executable instructions to select a real object identified by a given standard, from among the one or more real objects, as a default object, the computer is configured by the executable instructions to control display of a virtual object associated with the default object in a manner that the default object is capable of being identified by the user, in case the interested object is not designated by the user, the circuitry is configured by the executable instructions to change the default object to a new default object in case the input image changes to a new input image as an angle of the image pickup apparatus changes such that the new default object is selected from among another one or more real objects shown in the new input image after the angle of the image pickup apparatus has been changed, and in case the interested object is designated by the user, the circuitry is configured by the executable instructions to keep the interested object without changing the interested object to a new interested object even in case the input image changes to the new input image as the angle of the image pickup apparatus changes.

* * * * *